United States Patent [19]
Wanderer et al.

[11] Patent Number: 5,491,796
[45] Date of Patent: Feb. 13, 1996

[54] APPARATUS FOR REMOTELY MANAGING DIVERSE INFORMATION NETWORK RESOURCES

[75] Inventors: James Wanderer; Claus Cooper, both of Mountain View; Mark Gerolimatos, San Carlos; Michele Chen, Mountain View, all of Calif.

[73] Assignee: Net Labs, Inc., Los Altos, Calif.

[21] Appl. No.: 965,350

[22] Filed: Oct. 23, 1992

[51] Int. Cl.[6] .................................................. G06F 11/30
[52] U.S. Cl. ................... 395/200.09; 395/650; 395/700; 364/230.0; 364/276.0; 364/281.6; 364/DIG. 1
[58] Field of Search .................................. 395/200, 325, 395/700, 650

[56] References Cited

U.S. PATENT DOCUMENTS

| | | | |
|---|---|---|---|
| 4,356,475 | 10/1982 | Neumann et al. | 340/521 |
| 4,962,473 | 10/1990 | Crain | 364/423 |
| 4,995,035 | 2/1991 | Cole et al. | 370/95.2 |
| 5,101,354 | 3/1992 | Mowers et al. | 364/410 |
| 5,109,486 | 4/1992 | Seymour | 395/200 |
| 5,200,987 | 4/1993 | Gray | 379/40 |
| 5,261,044 | 11/1993 | Den et al. | 395/159 |
| 5,261,089 | 11/1993 | Coleman et al. | 395/600 |
| 5,299,207 | 3/1994 | Fujii | 371/29.1 |

OTHER PUBLICATIONS

Reid, P. "Networking under New Management" What's new in Computing, pp. 105, N8, N10, Jun. 1991.
Simpson, D. "SNMP, Simple but limited" Systems Integration vol. 23, No. 12, pp. 26–30.

*Primary Examiner*—Ken S. Kim
*Attorney, Agent, or Firm*—Gray Cary Ware & Freidenrich

[57] ABSTRACT

In a data exchange network, in which various resources, such as hubs, routers, etc., distributed across the data exchange network are remotely controlled from a single point of maintenance, a consistent approach is provided for managing the network hardware resources. A set of consistent displays is provided for remote front panels allowing visual management of remote, heterogeneous devices, while also allowing the display of nongraphical data in a usable form.

A common user interface allows operator control of the network, which may include many disparate types of equipment, supplied by various manufacturers. User definition of each network element is allowed based on a uniform vocabulary of element representations. A network management architecture provides a common development language for describing specific functions and attributes of network elements. Each element includes a protocol module which, in conjunction with a system engine, effects coordinated network control.

12 Claims, 3 Drawing Sheets

APPARATUS FOR REMOTELY MANAGING DIVERSE INFORMATION NETWORK RESOURCES

BACKGROUND OF THE INVENTION

1. Technical Field

The present invention relates to data transfer networks. More particularly, the present invention relates to remote management of network elements in a data transfer network.

2. Description of the Prior Art

Until recently, data processing meant batch processing using enormous mainframe computers. Mainframe computers contained all of the system intelligence and served this intelligence on a time sharing basis to a variety of dumb peripheral devices, such as terminals, printers, etc.

The centralization of batch processing and mainframe computing is now giving way to a society of intelligent users, such as workstations, servers, etc., distributed across a network. Thus, in modern data processing architecture the mainframe has been turned inside out. That is, each remote location in a modern network is a powerful individual, while the network is becoming a highly sophisticated interconnecting nervous system, akin to an internal mainframe bus in complexity, or perhaps even more complex.

The advantages of providing considerable computing power to individuals on their desktops are well recognized. As networks are required to handle increasing volumes of information, the network itself must become increasingly intelligent. The network must manage network traffic, network resources, user and management requests; it must detect failures and collisions, reroute traffic, and even repair itself. If this task were not formidable enough, the network must allow for the considerable diversity of network elements the many vendors of netware provide, in such manner that each and every network element not only communicates with other network elements, but so that network management is a straightforward and relatively simple task.

The state of the art provides many options to a network designer, including highly intelligent network devices, such as routers, switches, etc., that use the network to send status information to a net manager, and that may be configured remotely by commands issued from a network manager. Thus, the industry recognizes a standard network management protocol, the 'simple network management protocol' ("SNMP"), by which the devices of different manufacturers may be controlled using a common command set and data format.

Devices that respond to and communicate with SNMP commands rely on manufacturer supplied agent management software that is resident in a network management data base. An example of such device is the AsantéHub 1012 10 BaseT hub and the AsantéView™ management software, manufactured by Asanté Technologies of Sunnyvale, California.

The user interlace of each manufacturer's sortware for each agent has its own 'look and feel.' Thus, although the protocols that each agent uses are the same, there is no commonly accepted user interface. The state of the art is such that the various proprietary software drivers are, at best, difficult for a network manager to use and maintain. For example, the user interface in most such drivers may or may not require the manipulation of strings of raw data, or the entry of data into crude forms. Thus, highly skilled personnel are required to perform a tedious and repetitive task.

Accordingly, a network administrator is faced with occupying maintenance personnel with the many problems attendant with inconsistent equipment models: redundant manipulation and entry of the same data in different formats, inconsistent and inaccurate network models, stale data as information from one piece of equipment does not track that of other equipment, slow operator response on a network level to equipment changes, new training is required for administrative personnel when a new piece of equipment is added to the network, etc., all in the context of many complex device drivers that are difficult and expensive to use and maintain.

A network failure carries the potential for significant damage to network users, e.g. through lost or miscommunicated data. Network administrator response is less than optimum when the administrator is expected simultaneously to recognize and respond to many different non-intuitive data presentations. Thus, present day network management technology does not reduce the likelihood of injury to a network user in the event of failure. Accordingly, such technology is at best at a crude state of development.

A single point of maintenance for network resources, much like a control tower at an airport, is necessary to assure efficient and secure use of the network. A consistent, intuitive representation of all network elements would allow decisions to be made on resource allocation, maintenance, etc. based on meaningful information.

SUMMARY OF THE INVENTION

The present invention provides a network management system in which various elements, such as hubs, routers, workstations, etc., distributed across a data exchange network are remotely controlled from a single point of maintenance.

The present invention provides a consistent approach for managing the hardware resources of a network. The present invention provides a set of consistent displays for remote front panels providing visual management of remote, heterogeneous devices, while also allowing non-graphical data to be displayed in a usable form.

At its highest architectural level, the present invention consists of three components: a compiler that allows the creation of device specification files (DSFs) from device specification language (DSL) specifications, an engine that allows remote management of these devices, and network agent-specific DSFs.

The engine reads a DSF created by the builder and produces a view of the agent for remote management. Therefore, multiple DSFs may be provided for the various devices in the network, using the same engine for each agent.

The device specification file defines the graphical view of the agent as multiple objects or hotspots. Depending on the properties of the hotspot, certain functions are available. For example, selecting a port allows additional monitoring and/or configuration to be performed; the agent may be polled for certain management information base (MIB) attributes which may be displayed in a table, graph, etc. Additionally, the present invention allows the abstraction of raw data to present agent information in otherwise unavailable formats.

System rules provide conventions by which network operational data representative of real time network activities may be modeled in a virtual environment. Timestamping and data caching assure that an accurate representation of the network is provided, while actual use of the network by the management system is minimized.

DETAILED DESCRIPTION OF THE INVENTION

Figure 1:
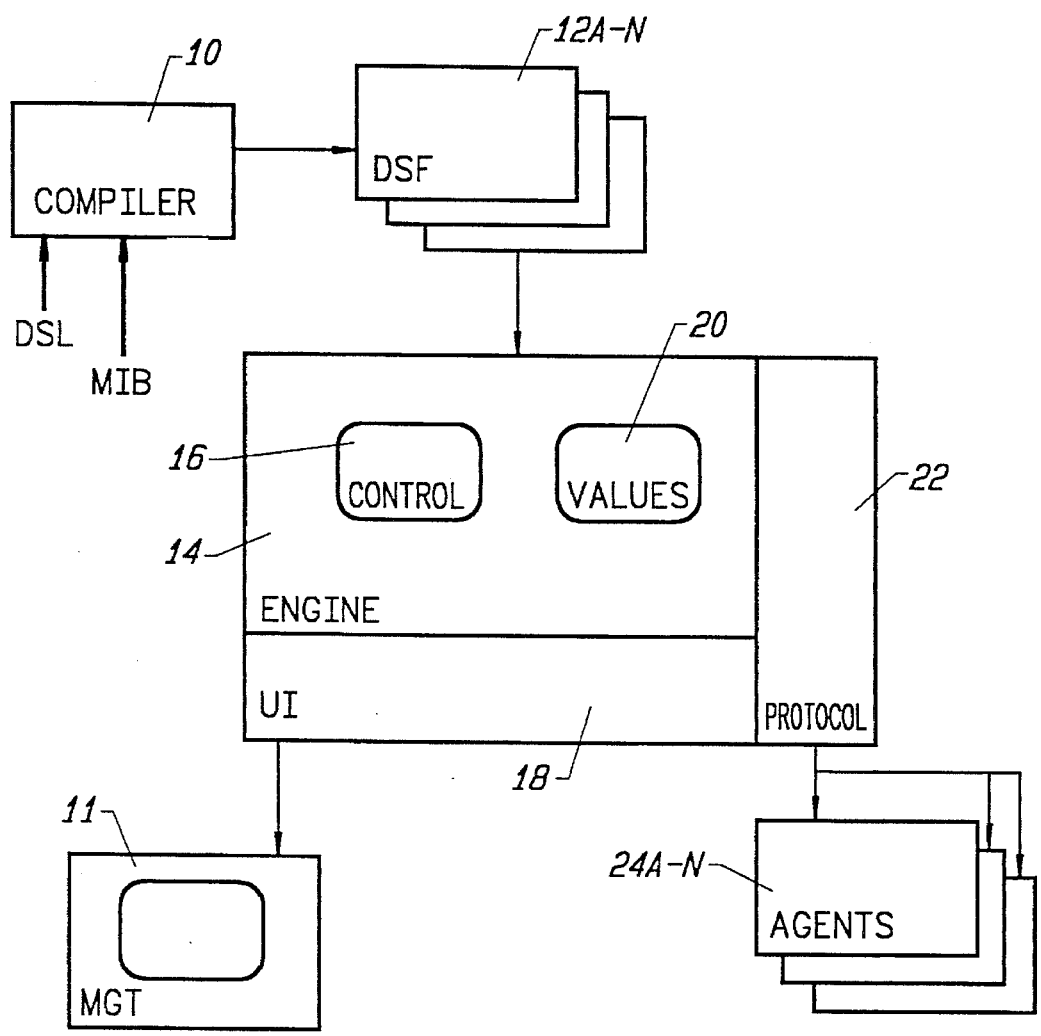
FIG. 1 is a block diagram of a network management system architectural model according to a preferred embodiment of the present invention.

The present invention is best understood by referring to the Drawings in connection with review of this Description. The present invention provides a network management system that allows control of various network elements and processes from a single point of maintenance.

The present invention provides a consistent approach for managing the hardware resources of a network. In one embodiment, the invention is a set of consistent displays for remote front panels providing visual management of remote, heterogeneous devices.

As shown in FIG. 1, the present invention consists of three components: a compiler or builder 10 for producing graphical representations of remotely located vendor-specific devices (device specification files or "DSFs"), an engine 14 for the remotely managing these devices, and the DSFs 12a–12n.

The engine 14 reads the agent specification created by the compiler 10 and produces a view of the agent for remote management at a management location 11. The invention allows multiple device specification files 12a–12n, using the same engine to drive these files.

The device specification file defines the graphical view of the agent as multiple objects or 'hotspots'. The invention provides certain functions, depending on the properties of the hotspot. For example, selecting a port allows additional monitoring and/or configuration of the port.

The agent may be polled for certain MIB attributes which may be displayed in a table, graph, etc. The polled attributes are static for a given DSF, but the display mechanism is user-selectable from a fixed set of options. Thus, information may be represented in otherwise unavailable formats. In particular, raw agent data may be processed to derive desired information in a desired format. A version identifier is stored in the DSF to assure compatibility with future versions of the engine.

Hardware. In the preferred embodiment of the invention, the engine runs on the Sun SPARCstation platform. There are many different platforms for other embodiments of the invention that are possible and within the scope of the present invention. Such platforms may include, for example SCO, Int$_e$l x86, RS6000, and others.

Development Tools. The preferred embodiment of the present invention is implemented in C++.

Architectural Model

High-Level Description. The present invention provides a consistent mechanism for managing heterogeneous devices. The engine 14, by supporting distinct devices through separate device specification files 12a–12n ("DSFs"), allows the user to remotely monitor and control diverse devices or agents 24a–24n in a consistent way.

The DSF includes powerful building blocks with which a useful management application for each network agent can be created. Typically, a visual representation of the front panel of a agent is developed, with certain pictorial elements, such as LEDs, given special functionality. These elements can be defined such that they are updated on a regular basis to give an accurate, visual view of the current state of the agent. Windows containing agent-specific information in tabular or graphical form can also be created using these building blocks.

An important feature provided by the present invention is data abstraction. The DSF can specify that information to be displayed be manipulated using a set of built-in operations provided by the engine. For example, rather than displaying the total number of collisions for a port, the present invention can instead display the percentage of collisions relative to the total number of packets for a port. This gives the user a significantly more useful view of the data available.

The present invention also provides poll optimization. If one piece of MIB data, for example, is displayed in several windows, the present invention optimizes the generation of polls so that only one poll is sent for that piece of data, rather than one poll for each window. In addition, the present invention transparently combines polls for different pieces of data whenever possible to limit the proliferation of polls, and thus minimize use of the network for management activities.

The engine also gives the user a form of security by providing two modes of operation: read-only and read-write, with a visual indicator of the current mode. The present invention can only be in one mode at any given time. Placing the present invention in read-only mode helps to prevent accidental configuration of the agent.

Brief Descriptions of Architectural Elements

Control. The control 16 is responsible for system startup and shutdown; it also registers "events" of global interest (e.g. reception of SNMP trap); receives requests from the user interface 18 ("UI") to issue SNMP set requests; and provides additional functionality, such as logging, configuration scripts, etc.

User Interface. The user interface 18 defines user interface component types, instantiating, and updating components; and implements some command functionality, such as open/close view, switch between read/read-write mode.

Device Specification Language ("DSL") Compiler. The DSL compiler or builder 10 is responsible for parsing of device specification files; and makes calls to the user interface and values modules (described in greater detail below) to set up component types, global values, and histories.

Values Module. The values module 20 is responsible for system internal storage and manipulation of information received from a remote agent.

Protocol Module. The protocol module 22 is responsible for communication with management targets 24a–24n (e.g. SNMP items).

The DSL and the User Interface Module

The DSL is used to create files which are compiled by the DSL compiler 10 to provide specifications from which the User Interface Module 18 registers component types defined in the DSF, configure the system dialogs, and instantiate or abstract specific components.

Type Registration. The DSF contains type definition records. These type definition records describe the information needed to create a new type. To register a new type, the record must describe the built-in type from which the defined type is sub-classed, as well as the name of the new type. The DSL Module parses this information, and then calls the function that registers a new type in the UI Module. An identifier is returned that allows the registration of other information (properties and rules) described in the type definition record.

Property Registration. During the parsing of a type definition record, after the new type has been registered, additional properties are defined. These properties are registered by name for the current type.

Rules Registration. Type definition records contain rules that are unique to the type they define. These rules define the value of specific properties and typically contain value expressions. Once the value expressions are parsed, and the expression is registered, the rule is registered with the UI Module. For example, a rule can be registered that sets the color of an LED based on the value of a set of attributes sampled from a remote agent.

Component Registration. Type definition records refer to other types as sub-components of the type being defined. This feature of the invention allows the construction of composite types. These components are referred to by type name. Geometry and instantiation information are also described. Given this information, a type may be registered as a sub-component of the defined type.

Component Instantiation

The construction of component instances from their registered type definitions is also governed by the rules described above. Thus, the structure of views can be dependent on the information obtained from the agent. Components having a dependency of this type are not constructed until type information is available.

Component Interaction

Component interact by reading the values of other components properties. Some of this interaction is set up and specified by the DSF, while other interactions are set up automatically.

DSL and the Values Module

DSL 10 processes information that contains various expressions. These expressions are supported by the Values Module 20. Thus, there is considerable use of the Values Module by DSL.

Figure 3:
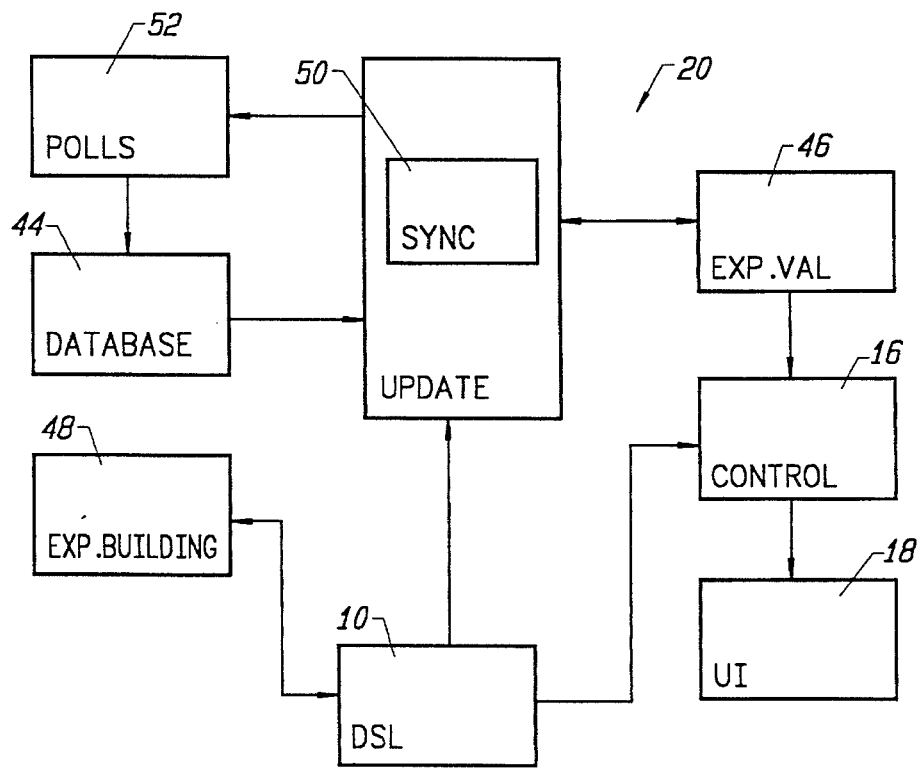
FIG. 3 is a block schematic representation of a values module architecture according to a preferred embodiment of the present invention.

Parsing Expressions. The DSL decode module is responsible for parsing expressions. As expressions are parsed, the expression builder functions are called in a bottom-up manner. When the entire expression is parsed and built, then the expression may be registered with the expression evaluation module 46 (FIG. 3). The expression does not need to be registered unless other expressions refer to that expression.

The expression is registered if the function is declared to have a name. Once the expression is registered, the Values Module can retrieve an expression identifier by name when references are made in the DSF to that function name. Thus, the Values Module can function as a simple symbol table for expressions.

Some component types defined in the DSL have expressions that are used in some component-specific manner. In general, this expression type is not given a name. However, depending upon the component, the function name is registered with the Values Module. This allows the implementation of the component to refer to an expression by the expression identifier, rather than require the maintenance of pointers to expression structures. The DSL decode module supports either method.

Registering Histories. Some values must be collected over time, even when there are no views displayed that are interested in these values. For example, it may be necessary to access data that was available during the lifetime of the current system session to plot the change of a value over time in a graph. When implementing a DSF, it is possible to specify that some datum, or expression is kept as a history. Histories must be explicitly declared in the DSF. A history has an expression, the value of which is kept in the history. The history also has data indicating the desired sample rate, storage limits, and technique used for trading accuracy for storage space in past samples.

Expressions Referencing Component Properties. Properties can be referenced in expressions. This allows the values of properties to affect the values of other properties in a manner specified by the DSF. Properties of the current component are referred to by the property identifier. The DSL parsing module must map property names to property identifiers for the type currently being parsed.

User Interface Module

The user interface module 18 is responsible for providing much of the visible functionality of the present invention. The user interface module provides routines that create new component types, add properties to a component type, and add subcomponents to a component type. The DSL module makes calls to these routines as it reads the information provided in a device specification file.

The UI Module uses the interface provided by the Values Module. That is, the UI Module registers callbacks on changes in values maintained by the Values Module. In some cases, the UI Module acts as a source of data for the Values Module, e.g. text entered by the user is provided as data for the Values Module. The Values Module provides routines that perform input conversion. The Values Module is also responsible for evaluating the expressions that check the semantic validity of the user supplied information.

DSF Defined Component Types

New component types are defined in each device specification file. Defined types are generally instantiated for use in a system session, rather than built-in types. Defined types are derived directly from a built-in component type and inherits all functionality of the built-in type.

Device Specification. The DSF contains agent-specific information. It contains the object identifier (sysObjectID in SNMP) of the devices that it supports, as well as the protocol to use to get information from the primary agent. There must always be a primary or super agent that knows about additional agents for a device, or additional protocols.

As devices are predefined to use some set of community strings for reading/writing groups of MIB objects, these groups and their associated community string identifier must also be defined in the DSF. This enables the display of a control window, including appropriate prompts when community strings are specified.

The DSF contains component information that defines the format of the picture. The actual picture depends on values obtained from the agent. The components are static upon instantiation; the values of the components vary. The DSF contains details on how to obtain data from agents (i.e. the MIB is contained in the DSF). Therefore, updated MIBs necessitate a new version of the corresponding DSF if support for additional MIB objects is required.

Compilation. A DSF is distributed for each agent supported by the engine. It contains all of the information necessary for the present invention to manage the agent type. Each DSF is translated by a compiler into an agent specification, which is used by the engine.

Registering Histories. Some values must be collected over time, even when there are no views displayed that are interested in these values. For example, a graph may want access to data that was available during the lifetime of the current session to plot the change of a value over time. A DSF may specify that some datum or expression is kept as a history. Histories must be explicitly declared in the DSF. A history has an expression, the value of which is kept in the history. It also has data indicating the desired sample rate, storage limits, and technique used for trading accuracy for storage space in past samples.

Protocol Support

SNMP is supported in the preferred embodiment of the invention. Support for other protocols, such as CMIP, is considered within the scope of the present invention.

Initiation. The invention can be invoked from the command line with optional parameters. When it is invoked without parameters, a control view is displayed which prompts the user for an agent name. The invention provides a field for the user to type in the agent name or IP address. Once the view for an agent has been successfully initiated, a new agent cannot be specified.

The protocol module 22 uses the host name to obtain the IP address of the host. An SNMP request is sent to the agent to identify the type of device. A unique piece of information is retrieved that allows the selection of the appropriate DSF. In the preferred embodiment of the invention this information is the System Object Identifier.

The DSFs are located in one or more directories. The system configuration file, created and/or updated upon installation by a separate utility, is used to identify the specific DSF.

Community strings may also be provided on the command line, for possible invocation from a network management platform. The engine assumes all community strings on SNMP devices are public, if community strings are provided on the command line, they become the defaults. A control window is also available from the user interface to modify the community strings used to communicate with the agent(s).

Configuration Files

In addition to information provided by DSL, the invention requires additional configuration information to operate. The configuration file provides mappings from Agent identifier to DSF.

System Oonfiguration. Mapping is satisfied by the system configuration file. This file is accessible to every user in a network who is running the invention; it is not customizable on a user-by-user basis. There is a list of mappings within the file, each of which contains the following:

Agent id to DSL Maps a type of agent to a DSF (SysObject ID in SNMP).

Component Definition

The component control module possesses functionality that supports component types defined in the DSF. This functionality is defined as follows:

Type Registration. New types of components must be registered for use in the system. This registration takes the following information:
name of the component type
identifier of the base type Once the component type is registered, it can be referenced as a sub-component of another defined component type. Additional type parameters, such as additional properties, expressions for property values. sub-components, and sub-component instantiation rules can also be declared.

Addition of Properties. Once a component is initially registered, properties that are not included in the built-in type may be added by registering the properties. Registration involves the following information:
component type identifier
property name Property registration returns a property identifier. The property identifier is unique for a specific property name across all component types. This allows property references contained in expressions to be fixed during the parsing of the expression.

Properties serve as state information for the component. They can be viewed as local variables for component instances. Properties of built-in types may have real functionality. The values of built-in properties may be interpreted by the implementation as information describing display attributes. For example, TEXT could be a property of a text symbol, and the value of TEXT could be a string that defines what text is displayed to the user.

Addition of Rules. Rules are statements of invariance that describe the value of properties, based upon information that can be referenced in an expression. A rule is in the form of "<property> is <expression>". Rules are added by rule registration, which includes the following information:
component type identifier
property identifier
expression identifier
argument bindings Argument bindings are references to instance properties. These properties are set at instantiation. Instantiation properties may not change. Properties other than instantiation properties may not be used as arguments in rules, although the expression associated with a rule may reference properties. Argument bindings may also be constraints.

Addition of Sub-Components. A defined type may include sub-components that are not part of the base component type. The base components of the defined component must explicitly support the base component types of the sub-components. For example, a DSF might define a particular type of dialog with several text and label components, but not picture components. The base type dialog must explicitly support text and label components, but need not support picture components.

The addition of sub-components as a parameter of a defined type is done through sub-component registration. Registration involves the following information:
component type identifier
type identifier of the sub-component
geometry and positioning information
instantiation information
instance properties Registration returns the sub-component identifier (note that this is not a type identifier). This identifier is unique for the defined component. Properties of the sub-component must be referenced by the sub-component identifier.

Component Interaction. Defined components interact in two ways. The first component interaction is by default to built-in behavior. For example, on the issuance of a configure command from the user, a configuration dialog interacts with associated sub-component text symbols to get the symbols' contents.

The second component interaction is by property values, and by interpreting the values of specific properties in expressions. Components may refer to the properties of their parents and their children in expressions. Such reference is accomplished by a built-in Values Module operation. This operation involves a component instance (only known after instantiation), a component identifier (sub-component, self, or parent) and a property identifier. The component instance is passed as an implicit argument to all expressions.

References to a Child's Properties. A sub-component must be identified to reference a property of a sub-component. In the invention, a property value retrieval procedure involves a sub-component identifier and a property identifier. As the property identifier is constant for all types, it is not necessary to know the type of the sub-component when constructing the expression. The expression has access to an implicit pass of a component instance argument. Thus, the sub-component identifier functions as a local reference for the object when referencing the child's property. Reference to a subcomponent property uses the function 'read_prop' in an expression (defined below).

References to a Parent's Properties. Parent type is not known until instantiation occurs. To construct an expression with a reference to a parent property at the time class definition occurs, it is necessary that all property identifiers be well known and based upon the property name, or that the property identifier be passed as an argument to the expression. The preferred embodiment of the invention employs constant property identifiers to construct the expression. Reference to a parent property occurs in an expression, using the function 'read_prop' (defined below).

Built-In Components. The engine portion of the invention includes a set of built-in components, each of which is implemented in a C++ class derived from a Component type base class. Specific descriptions of these components follow:
Graphs
Functionality
Properties
Window System Layer Function Calls
Protocol
Graph Server User Interface Functionality This section discusses the user inteface ("UI"). Two levels of UI functionality exist. At one level, the invention supports the definition and description of user intefaces which are tailored to a particular type of network agent.

A higher level, the invention provides UI functionality as seen by the end user. This includes what windows, or views, a user is shown when using the present invention, and the operations that a user can perform using invention.

Functionality Overview. The user inteface consists of a set of views (see FIG. 2, which is a schematic representation of a hypothetical front panel view for a hub). Each view is displayed as a separate window on the user's screen. A view provides access to a particular part of the invention's functionality. The primary functionality associated with a view falls into one of four categories:

1. Display of Information Retrieved from the Managed Device. This encompasses the display of raw and derived data, such as packet counts, error rates, bandwidth utilization, etc., in various forms.

2. Configuration of the Managed Device. The invention supports issuing of SNMP set requests.

3. Control. This encompasses such operations as setting operational parameters (e.g. system poll rate and community strings), quitting the application, etc.

4. Help. Help views contain detailed information describing the displayed data. They also display information describing possible operations from the view.

Some views are completely defined by the engine. The functionality and appearance of these views are independent of the particular type of agent managed. However, the majority of the views are tailored to a particular type of agent, and therefore are not completely defined and implemented by the engine. These agent specific views are described in the DSF.

The following sections describe the UI functionality in detail. Functionality as seen by the end user is presented first. This functionality is referred to as view level functionality. The sections on view level functionality cover general behavior of agent specific views, and provide some examples of hypothetical agent specific views. These sections also address control views. Help views are described in a later section.

User Interface Views. As described in the previous section, there are four distinct categories of view functionality: Information Display, Device Configuration, Control, and Help. The following sections discuss the individual types of views.

Information Display Views. Retrieved management information is displayed in information display views. A view is either graphics-based or text-based. The first view displayed at start-up is usually a graphics-based view containing an image that looks like the front panel 30 of the agent being managed (see FIG. 2). This view is referred to as the front panel view. The text-based information display views are referred to as report views. Menus found in the front panel view allow the user to open other views.

Front Panel View. The front panel view 30 contains a diagram representing the remote object being managed. The front panel view is described in the DSF. The diagram is dynamic in that it "updates itself" when the state of the remote object has changed (more precisely, when retrieved information differs from previously retrieved information), and it is interactive in that the user may select elements within the diagram and ask that more detailed information be provided about the selected elements.

Figure 2:
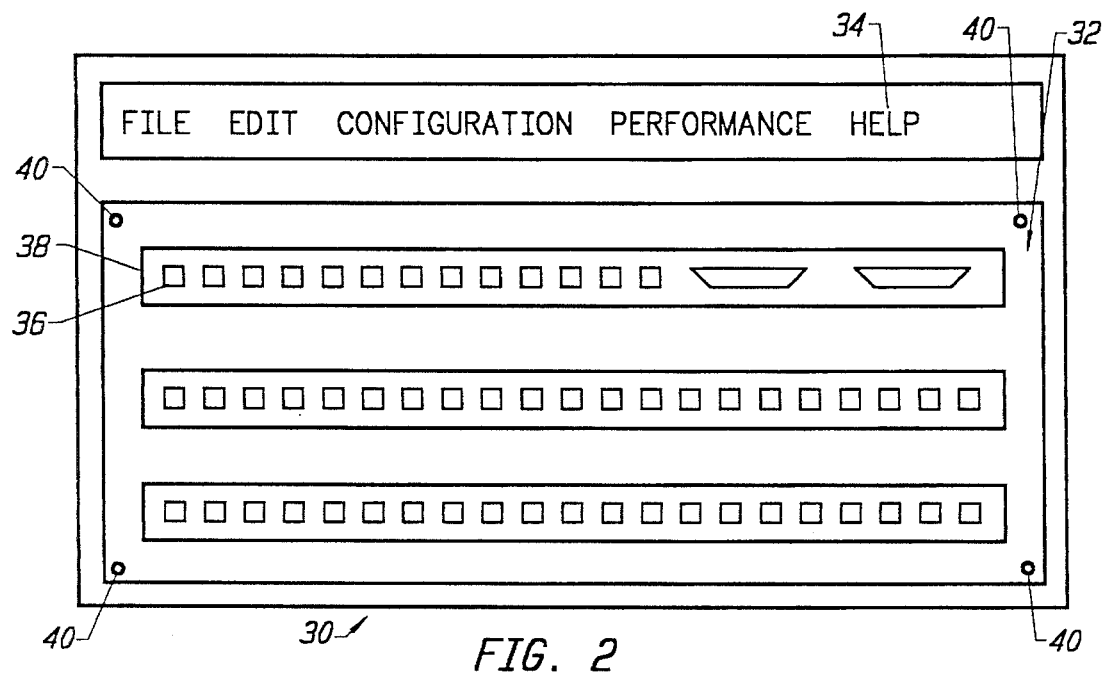
FIG. 2 is a schematic drawing of a hypothetical front panel view for a hub according to a preferred embodiment of the present invention.

View Contents. FIG. 2 shows a hypothetical front panel view 30 for a hub. The view contains both a graphic diagram 32 and a menu bar 34. The diagram provides a realistic view of the agent. If desired, the invention allows a digitized picture of the agent to be used as the diagram background to obtain an even more realistic look.

Some elements of the diagram are individually selectable. For example, by selecting on one of the small square objects 36, the user indicates interest in an individual port. The user expresses interest in an entire board by selecting within one of the rectangles 38 that contain the small squares. The menus available from the menu bar allow the user to open views providing more detailed information on the elements that have been selected. The mechanics of selection are described below.

In the preferred embodiment of the invention, the front panel view is called a workbench view. The workbench consists of a picture that contains selectable elements and two lists. The first list contains the names of all of the selectable elements in a given set. The second list contains descriptions of the operations that can be performed that specifically apply to the current set. A set of elements consists of common types. That is, ports may be members of a port set, and boards make up a different set. This allows views that apply to only one type of element to be presented as such.

Elements may be selected by clicking on the pictorial representation, or selecting on the corresponding name in the list. The operations in the second list are invoked by a double click on the operation description.

The currently selected set is the set whose members are listed in the first list. The currently selected set is changed by selecting on a pictorial element that is not in the currently selected set. This causes the set that the element is a member of to become the selected set. For example, if the board set is currently selected, selecting a port changes the port set to become selected, and all of the selectable ports are listed in the first list.

User Interaction. The user interacts with this view by selecting elements of the diagram and making choices from menus. When a menu choice is made, new views are opened. The new views, in general, contain information about the elements that are selected at the time the view is opened. It is also possible to open a new view by double clicking on an element of the diagram.

Control operations, such as Quit, are also available in the front panel view menus. Choosing a control operation from a menu opens the corresponding control view.

Selection of Diagram Elements. Elements are individually selectable by single clicking (mouse press, then release) the mouse SELECT button when the mouse cursor is located over a selectable element. Single clicking on any object deselects any and all selected objects, and then selects the object under the cursor, provided that object is selectable. This manner of selecting/deselecting a component deselects any previously selected components. Selecting an unselectable element results in the selection of the enclosing element. If the enclosing element is itself unselectable, then its enclosing element is selected, etc.

The user may select more than one element at a time. Single clicking with the extend selection mouse button while the SHIFT key is held down has the same results as a single click without the extend selection key being held, except that any previously selected elements remain selected. There is no restriction on the types of components that can be simultaneously selected.

Multiple items may also be selected by drawing a "rubber band" around them; all selectable items that are located entirely within the selected area become selected. A rubber banding operation begun without the extend selection key deselects any previously selected elements, while one begun with the extend selection key does not deselect previously selected elements. Rubber banding is defined by pressing, dragging the mouse beyond some threshold (so that accidental slight movement is not considered rubberbanding), and then releasing the SELECT mouse button.

Not all elements of the diagram are selectable. For example, the screws 40 (located at the corners of the diagram) are not selectable because they do not correspond to any management information provided by the agent. Rather, they are provided as part of the front panel as it actually appears on the agent represented in the view. Selectable elements may be discerned by holding down an assigned key. Selectable items then have a thin border displaying the bounding rectangle.

When an element is selected, its appearance changes so that the user may easily determine which elements are selected and which are not.

The diagram can contain "default elements" which are considered to be selected in the absence of any user selections. The default elements are considered unselected in the presence of user selections. Default elements are specified in the DSF description of the view.

Using Menus to Open Views. New views are opened by making menu choices. Menus are available from the menu bar, and also may be provided as a workbench or as popup menus when the mouse menu button is pushed while the mouse cursor is over an element.

The workbench view is also significant in opening new views. Specifically, the operations listed for each item set bring up a view tailored to that particular type of item.

Views reached by using the pull down menus on the menu bar of the main view are targeted at the entire box, rather than a particular piece. The currently selected items have no effect on the contents of these views.

Views that concern specific pieces of the box, i.e. a port, are invoked by using the workbench operations list, rather than an option in the pull down menu.

Popup menus are associated with particular elements, not with the view as a whole. Thus, when a view is opened via a popup menu, the format and contents of the newlyopened view do not depend on which elements of the diagram are selected. The format and contents depend only on the element over which the mouse cursor is located when the menu is popped up.

In some cases, the type of view opened by a menu choice is not applicable to some or all of the selected diagram elements. If the menu choice does not apply to any selected elements, it becomes unavailable for choosing. This can be determined by the appearance of the menu item. If the menu choice applies to some but not all of the selected elements, it is available.

Choosing a menu item that applies to some but not all of the selected elements opens views for the elements to which it applies. The present invention also brings up a dialog box notifying the user that views cannot be opened for some of the selected items. For example, if the user selects a port element and a board element, and then chooses a menu item that only applies to ports, a dialog informs the user that no view can be opened for the board. This is to eliminate confusion that may result when the number of new views opened is less than the number of selected elements.

Note that in the absence of any user selections, the default elements are considered to be selected, and the menu choices behave as if the user had selected the default elements. However, no warning dialog is brought up if the user chooses a menu item which applies to some but not all of the default elements.

Double Clicking on Diagram Elements. As with a view opened via popup menu, a view opened with a double click of the mouse depends on the diagram element indicated by the double click. Only one type of view can be opened by double clicking. This is known as the default view associated with the element.

Report Views

A report view is a text-based view that displays retrieved management information. It can contain labels, lists, tables, graphs, etc. Graphs are not text-based, but they are logical components of report views.

Report views are dialog boxes that contain:
a title bar (provided by the window manager) along the top, displaying the type and source of the data reported
an optional menu bar containing choices for opening other views
one or more data displays (a data display is a piece of the view that displays management information obtained from the agent)
a set of view commands for performing view-level operations (e.g. Close)

There are two distinct types of report views. The first type is updated automatically as new data is retrieved from the managed agent, while the second is updated only at the user's request. Views of the second type have an Update button at the bottom of the view, while those of the first type do not.

Report View Contents

Title Bar. The title bar of a report not only gives the name of the report, but also enough instance information to let the user know for which agent, card, port, etc., the report is displaying data. The title bar does not change once the report dialog has been popped up. The rendering of the title bar is provided by the user's window manager.

Data Displays. The following data display types can appear in report views:
Labels
Scalar Display
List Display
Tabular Display
Graphical Display Label. A label consists of a static text field containing alphanumeric data. Multiple-line labels are allowed. A label typically describes the information to be displayed.

Scalar Display. A scalar display is a static data field with an appropriate label. Scalars combine a data field with a label field. The scalar data field may consist of any simple data type.

List Display. A list display contains a static list element with a corresponding label. Each item in the list consists of a label.

Tabular Display. Tables display data using a row/column tabular format. Scrollbars are dynamically available whenever the dimensions of the table exceed the defined size of the display.

Graphical Display. Graphs allow data to be displayed in a pictorial form. Bar and line charts are both supported in the preferred embodiment of the invention. The Y-axis of a graph can only be numerical: real numbers and integers. The X-axis of a graph can be any simple type. For example, it is not possible to graph port status ("On/Off") as a function of a port, while it is possible to graph the number of ports that are on or off.

View Commands. Most commands available from a report view are accessed by pressing the buttons located near the bottom of the view. In some cases, the user is able to open other views from a report view. The user issues view-opening commands by using the menu bar at the top of the view. Finally, views can contain option menus for controlling some aspects of a view's behavior.

Command Buttons. Each report view has a suite of buttons devoted to implementing commands and actions on the data displays. The following command buttons are supported:

Update. This button updates the data displayed in the report view. It forces a poll of all data within a report view independent of any polling schedules on the data displayed. Note that this is not equivalent to redisplaying the data, as the data requested is not guaranteed to "come back" from the remote agent. Rather, this is a request for updating of data, which may be denied.

Close. The close button pops down the report view.

The update capability is only available for views which are not updated automatically. The DSF controls. which views are updated automatically and which are updated at the user's request.

Command Option Menus. Option menus allow the user to choose one of a number of predefined options. The resulting choice can be used in a number of ways. For example, a view displaying rate information might have an option menu which would allow the user to choose the units: per second, per minute, per day, etc.

Device Configuration Views

Configuration views support operations that send configuration requests to the management target. They are described in the DSF. At the bottom of a configuration view there is a Configure button that sends the request to the management target. Data entry fields within the view allow the user to specify request-specific information. Configuration views allow the user to issue SNMP set requests.

If the view contains data-entry fields, the values in these fields first must be checked for validity. If a field contains invalid data, then the user is notified and the operation is canceled. The view remains, allowing the user to correct the error and retry the operation.

When issuing an SNMP set-request, for example, it is not possible to immediately determine if the operation succeeded or failed. The button for closing the view becomes disabled while the invention waits for confirmation of success or failure. Error messages generated by an attempted SNMP set-request are displayed in the configuration view. Disabling the close insures that the user sees any resulting error messages.

Configuration views also provide a Cancel button. Pressing the Cancel button while the system is waiting for the set-response prevents the set-request from being resent in the event that the request times out. The Cancel button does not always cancel the set operation because the managed agent may have already received a previously sent set-request.

Data Display Types. Configuration views display data, in addition to allowing the user to enter data. Therefore every kind of data display that can appear in a report view can also appear in a configuration view.

Configuration views also contain Text Fields'. Text Fields are scalar displays that can be edited. The DSF can associate conversion rules (e.g. for converting user-entered text to a number) and validation rules with a Text Field.

View Commands. Each configuration view has a suite of buttons devoted to implementing commands and actions. The following command buttons are supported:

Close. Closes the view. Disabled if there is an unacknowledged set-request outstanding Configure. Processes user-entered text and constructs an SNMP set-request which is then sent to the agent. Disabled if the engine is in read-only mode Cancel. Prevents additional set-request retries Control Views Control views allow the user to perform operations such as quitting, specifying a community string to use, etc. These views do not depend on the type of agent managed, and are not defined in the DSF.

Control View Format. The control subsystem consists of a suite of dialog boxes. Each dialog box contains three sections:

The "title bar" describes the general functionality of the dialog box. The title bar is provided by the window manager, and contains text that identifies the window.

The "work area" contains data displays to perform the tasks in question, and to display the current state of the features being modified.

The "view commands" provide a mechanism to implement commands and actions on the data displays.

Control View Functionality. All of the following views are accessible from menu items in the front panel view. The section headings approximate the names of the menu items.

Quit Control View. The quit control window is a confirmation view that asks whether or not the user really wishes to quit. The default is "cancel".

Mode Control View. The invention may be placed in one of two modes: read-only and read/write. When in read-only mode, no agent configuration can be performed, so most text components become uneditable. A graphic indicator to show the current mode is provided in the front panel view.

Poll Rate Control View. This view allows the poll rate to be modified.

Community String Control View. Within SNMP, the use of community strings provide a form of security for monitoring and configuring devices. This window reports the strings currently in use. The user is also able to modify the strings.

Help Views

Several forms of help are provided by the present invention, e.g. context-sensitive help for specific information in a window, a more general form ot help on windows to describe the basic features and operations available, and an indexed help which allows specific information to be searched.

Context-sensitive Help. Context-sensitive help is necessary to describe agent-specific information as well as specific fields or options. This type of help gives the user information specific to the current item, and is usually brief. For example, a window may contain X.25 connection information with a series of from/to addresses. The user could select the label or one of the address entries and press the Help key. This causes a small help window to display the help text.

Help on Windows. This form of help gives general information on a window. It is invoked by selecting the Help button on the specific window. This information consists of several paragraphs of information, and thus is a separate help window.

Indexed Help. Indexed help gives the user a list of general topics to select from and allows the user to either select specific topics to view or browse through the entire help database. A search facility is useful and allows the user to find instances of a particular topic.

Help Text Storage/Retrieval. The generic help information is stored in an engine text file. There is also help text specific to a DSF, which is stored in a DSF-specific text file. The text in the former file is referenced from both the DSF and the engine, while the text in the latter is referencible only from the DSF.

View Definition Functionality: UI Components

The user interface consists of a set of views. Many of these views are specific to the type of agent being managed. Device-specific views are described in a DSF, which is read by the engine at start-up time. The DSF contains "view descriptions", which specify the contents and behavior of the device-specific views.

The engine supports a user interface component. A user interface component (UIC) is an arbitrary piece of the user interface. For example, each view is a component of the user interface. Likewise, a view is composed of a number of distinct pieces such as text entry fields, labels, etc. These also are components of the user interface.

The labels, lists, etc., which make up a view are referred to as subcomponents of the view component. Any component can have subcomponents, so that a view component could contain another component which itself contains components. For example, the diagram found in the front panel view (see FIG. 2) is a complex UIC which has subcomponents. The small squares representing ports are UICs, and the rectangles which enclose the small squares are UICs.

UICs provide a high level of functionality because it is necessary to specify their behavior without adding object code to the engine. This is done by associating an expression with a UIC property. The expression determines the value of the property. The expression can contain references to retrieved management information. As the retrieved information changes, the value of the expression also changes, thereby changing the value of the property. The expression can also contain references to properties of other components, allowing UICs to interact with each other.

In some cases, the value of a UIC property is used to determine aspects of the UIC's appearance (color, for example). However, not all properties are directly related to determining what the UIC looks like. Some UICs also support high-level functionality to deal with user interactions. Error checking on user-entered text is available, and there is built-in behavior to handle user selections.

A UIC has hierarchical structure, since it can have subcomponents. To provide adequate flexibility, the present invention provides several control techniques for specifying the structure, or composition of a UIC. A UIC can have subcomponents that are always present, subcomponents that are conditionally present (conditional subcomponents), and a set of subcomponents that are all of the same type, but with the number determined at runtime rather than at DSF creation time (iterative subcomponents). A Boolean expression is evaluated to determine if a conditional subcomponent should be present. As with property expressions, the Boolean expression can involve retrieved management information. The number of iterative subcomponents required is determined by information retrieved from the management target. The three techniques of composition description used by the present invention are analogous to the control structures provided in many programming languages: sequencing of statements, conditional execution of a statement, and iteration of a statement.

UIC Types. A UIC is described by a UIC type. A UIC type specifies both the properties of the UIC and the structure of the UIC (if it has subcomponents). A UIC visible on the user's screen is an instance of a UIC type. The "view descriptions" in the DSF are UIC type definitions. The process of creating a UIC on the screen from a UIC type is referred to as component instantiation.

Each component of the UI, whether something as simple as a button or as complex as a view, has an associated type. The type of a component describes both the structure and the behavior of the component. The DSF contains, among other things, UIC type definitions. A UIC type definition contains one or more of the following:

Base Type
  Instantiation Parameter Declarations
  Property Declarations and Definitions
  Component Declarations and Definitions
  UIC-to-View Mappings
  Input Conversion Rules
  Input Validation Rules Base Type. Every UIC type has an associated base type. The base types are predefined. The base type determines if the UIC type describes a label, a text-entry field, a view, etc. Only the predefined base types may be used as the base type in a UIC type definition.

A base type defines a number of properties whose values have special meaning to the engine. For example, a base type may define a BackgroundColor property. The engine uses the value of this property to determine the background color of the component instance.

Instantiation Parameters. A UIC type may specify a number of instantiation parameters. When a component instance is created, values must be provided for the instantiation parameters. An instantiation parameter defines a property whose value remains fixed for the lifetime of a component instance.

Component Properties. A UIC type defines a number of component properties. A component property has a name and value, as well as a type. Some of these are defined by the base type. Others are defined by the instantiation parameter declarations.

In addition to properties defined by the base type and the instantiation parameters, a UIC type may declare and define other properties that allow the DSF designer to maintain component-specific information.

A proper declaration specifies the name of the property and its type. A property definition provides an expression that is used to give the property its value. The expression may reference MIB information, other properties of the component, global properties, and properties kept by the component's parent and children. Changes in the value of the expression cause the value of the property to be updated. Updates are performed periodically rather than continuously, and there are therefore periods during which the value stored in the property and the value of the expression disagree. These periods are relatively short, however, and are not noticeable by the user.

Property Errors. No circular dependencies in the expressions are allowed to insure that property values are well-defined. The property defined by an instantiation parameter cannot have an associated expression, because this would introduce ambiguity with regard to the origin of the property's value. It is an error to define an expression for a property defined by an instantiation parameter declaration.

Property Types

The following basic property types are supported by the preferred embodiment of the invention:
  Boolean
  Integer
  Real
  Enumerated
  String
  Block (list of octets)

In addition to the basic types, the present invention supports aggregate types. The only aggregate type available is List. As in LISP, the elements of a list can be of any type, including list.

In other embodiments of the invention, it is possible to support a richer set of types to allow the invention to be used with CMIP agents.

Property Expressions

For each basic type, a standard set of operations is available, e.g. addition for integers, concatenation for strings, equality operator for almost everything, etc.

An operator that allows the reading of property values from other components is provided. A component may only read the property values kept by its parent component; by itself; and by its subcomponents.

Subcomponents

A UIC type may declare and define a number of subcomponents. The base type determines whether or not the type can have subcomponents. A subcomponent declaration specifies the name and type of the subcomponent. The subcomponent definition specifies expressions whose values are given to the subcomponent as instantiation parameters.

The subcomponent definition also specifies whether the component is unconditional, conditional, or iterative. If the subcomponent is conditional or iterative, the definition also provides an expression whose value controls the conditional or iterative instantiation of the subcomponent.

For a conditional subcomponent, the expression is a Boolean. If the expression evaluates to TRUE at instantiation time, then the subcomponent is instantiated. If the expression evaluates to FALSE, then the subcomponent is not instantiated and does not appear in the resulting component instance.

For an iterative subcomponent, the expression is a list. A subcomponent instance is created for each element of the list. A special "property" is assigned the value of each list element in turn, so that the list element may be given as an instantiation parameter to the subcomponent.

UIC-to-View Mappings

New views are opened when the user selects a UIC and then chooses a menu item which opens a view. The menu item describes a kind of view, e.g. Status, Performance, etc. The specific type of view that is opened depends on the information kept with the selected component.

The DSF associates a 'default view' with a component. This is the view that is opened when the user double clicks on the component. For example, the diagram in the front panel view (FIG. 2) contains elements that represent ports and boards. These elements are component instances with associated UIC types. Both the type for the port and the type for the board may specify a mapping for "Status". But the type of the port component maps "Status" to a UIC type that describes a view for showing the status of a port; while the type of the board component maps "Status" to a UIC type that describes a view for showing the status of a board.

Input Conversion

The DSF specifies disposition of text entered by the user. The resulting values are used principally as the value of variable bindings sent in SNMP set requests.

Input Validation. Once user-supplied text is converted into meaningful values, the DSF performs a semantic check on the input. For example, an integer may have to be between 0 and 100.

Predefined Base Types. Component base types are provided by the engine. The base types provide a predefined set of behaviors. Appearance and predefined behavior is controlled by a set of predefined properties and the values they take on. The values are not predefined, but instead are determined by expressions specified by the DSF.

There are three UIC base types; graphic, text, and view. Graphic base types are used to construct the diagram in the front panel display. Text components are used in the construction of text-based views. View components include graphic views, which support the front panel display; and text-based views, which support both information display views and agent configuration views.

View Components. Each agent-specific view has a corresponding UIC type in the DSF. The base type for the UIC type is one of several built-in view types. The preferred embodiment of the present invention provides the following built-in view types:

Dynamic Text-Based Display View. Provides: optional menu bar, Close button, Help button (if menu bar not used). Used only for displaying Information. Contents are updated automatically as new data comes In.

Static Text-Based Display View. Provides; optional menu bar, Close button, Update button, Help button (it menu bar not used). Used only for displaying information. Contents are only updated when Update button is pressed.

Graphic Information Display View. Provides: menu bar. Used for views which contain graphic diagrams, like the front panel view.

Device Configuration View, Provides: optional menu bar, Close button, Set button, Help button (if menu bar not used). Supports SNMP set request. Can also contain display-only components.

Text Display View Base Type

Display views are used exclusively to view information. The base type for these views provides a Close button. They also provide an optional menu bar. The menus in the menu bar are used to open other views. The menu bar also contains a menu for Help. If the menu bar is not used, a Help button is provided.

In some cases, it may be desirable to provide a view having contents that are updated automatically as new information is received. In other cases, it may be desirable to allow the user to determine when the view is updated. To address this, the present invention provides two distinct base types for text-based display views. The type that gives the user control over view update has an Update button at the bottom of the view, while the type that updates automatically does not have an Update button.

A view whose base type is Text Display View can only have subcomponents which are text-based; such a view cannot have graphic subcomponents.

Graphic Display View Base Type

Some views contain graphic diagrams. The base type for these views provides a menu bar. These views are always automatically updated as new information is received.

A view whose base type is Graphics Display View can only have subcomponents which are graphics-based; such a view cannot have text-based subcomponents.

Device Configuration View Component

Configuration Views contain text subcomponents. This base type also supports validation rules that are used to check user input for validity. The base type provides a message area for displaying error messages. When a validation rule fails, the associated error message is displayed in the message area. Conversion rules may also fail, and the messages generated when this happens are also displayed in the message area.

At the bottom of the view are several buttons: Close, Configure, Cancel. The Close button dismisses the view. When a set operation is in progress, the Close button is disabled. When the Configure button is pressed, the information entered by the user is used to build a configuration command. The contents of this configure command is described by the DSF.

The DSF describes conversion of user input and associations of converted results with MIB variable. In the preferred embodiment of the invention, the configure command is an SNMP set request.

The Cancel button causes the retry of a set request to be canceled.

Graphic Component Base Types

Components whose base type is one of the graphic component base types are used to construct diagrams displayed in graphic display views. Graphic components are geometric objects, such as circles and rectangles. They can have subcomponents, which must also be graphic components. A graphic component defines a coordinate system for its subcomponents. All subcomponent positioning information is relative to a coordinate system defined by a parent component. Each graphic component has a bounding rectangle. User mouse clicks in the bounding rectangle are delivered to the component.

A graphic component can be filled with a solid background color or pixmap. The foreground color is used to draw the border. When selected, the colors are modified to highlight the selection. The width of the border can be specified. Instead of being filled with a solid color, a graphic component may be filled with a pixmap which is drawn using the foreground and background colors. The pixmap is clipped, such that no portion of it lies outside the border of the graphic component. All graphic components support popup menus.

Two graphic component base types are available: circle and rectangle.

Text Component

Labels. Labels display one or more values. The layout of a Label is always horizontal, i.e. all values are displayed on the same line. For each value, the Label knows the width of the text used to display the value. Each value appears in its own label field. For each field, the Label maintains a field width and a justification policy which is one of left, right, or center. When left justification is used, the Label also maintains a left offset which determines the space between the left side of the field and the left-most character of the value text. The same approach is applied when right justification is used.

For each field within the Label component, the following items are kept as properties: value, value width, value offset within field, field width, justification policy.

Text Entry Fields. Text Entry Fields allow the user to enter text information. Much of the behavior associated with such fields is determined by the underlying set (e.g. Motif or Open Look). Error checking, however, is provided by the invention itself.

As values entered by the user have to be checked for validity, a Text Entry Field has an associated Boolean expression which yields TRUE if the value entered by the user is valid, and FALSE if the value is in error. Both the text entered by the user and the value of the Boolean expression are available to the parent component containing the Text Entry Field.

Menus. The menu base type allows the DSF to specify the choices provided in a menu. The menu may be used both as a pulldown menu from a menu bar and as a popup menu associated with a graphic component.

A pulldown menu is a way to group a set of dialog-opening buttons together. The built in UIC types which have menu bars can specify one or more pulldown menus which are then made available through the menu bar.

A component may specify a single popup menu. The menu is popped up when the user presses the mouse Menu button over the component.

Option Menus. An Option Menu groups a set of buttons together. It provides a list of options, and retains information on the current option. This knowledge can be accessed by the parent component of the Option Menu.

Lists, A List is a component that corresponds to the Motif Scrolled List widget. A List may include scroll bars, and it supports selection of the items displayed in the list.

A list is a composite UIC that can have Labels as subcomponents. A List has a Label subcomponent that specifies column headings. A List also has an iterative Label subcomponent which is used to describe the contents of the list. Each content Label can be updated independently and is selectable by the user.

Values Module

The Values module is responsible for information retrieval, storage, and manipulation. The module includes polling, expression evaluation, and event notification. The functionality of these areas is narrow and limited to system needs. The Values module 20 (as shown in block schematic form in FIG. 3) includes the following sections:

Data Representation
Expression Evaluation and Building
Synchronous Update Module
Remote Information Retrieval
Information Storage Data Representation (DRep). Data that are handled by the values module are represented by a Data Representation class. This class supports all of the data types provided in the invention. When expressions are evaluated, DReps are produced. The Values Module provides all collected and calculated information to other modules as DReps. All of the operations that are defined as operators in expressions are supported in the DRep class (except for Property Lookups).

The purpose of DReps is two fold. It is desirable to abstract the data collected and calculated from the code that handles that data in the system to the greatest extent possible. However, once the values are decoded, they are represented as primitive C types. Thus, it is difficult to handle strings of bytes that are not null-terminated, integers larger than the word size of the system, etc. To support double sized integers, a great deal of diverse code, located in many unrelated areas, would have to be written. The present invention avoids this problem by providing DReps.

The second purpose of the DRep in the present invention is to serve as a general interface between sub-modules within the values module, and between the values module and the rest of the system.

Data Representation Class Definition—Private Data. The following code fragment details the private data for the DRep class:

```
union DRepValue {
public:
    String          szVal;          // String value
    int             *rgintVal;      // Big integer value
    double          doubleVal;      // Float value
    list            *pList;         // List value
    Set             *pSet;          // Set value
    TimeStamp       *pTimeStamp;    // TimeStamp Value
    ErrorVal        *pErrorValue;   // Type of Error
    History         *pHistory       ;          // History
}
```

The union implies that a DRepValue can take on only one of the listed types. Note that pointers to the complex types (List, Set, etc.) are necessary because types with constructors may not be included in unions:

```
enum DRepValueType {DR_String,DR_int,DR_Float,DR_List,
                    DR_Set,DR_Time,DR_Error,DR_History,
                    DR_Agent,DR_Wild};
class DRep{
private:
    DRepValueType   valueType;      // Type of data
    DRepValue       dRepValue;      // Value of data
}
```

Only one type of value is valid at any one time. Many of the functions may be delegated to the class of the type. The DRep class insulates the code by using the types from the type classes, and enforces and coordinates inter-type interaction. Thus, when an integer is added to a list, the list module does not need to understand this operation. Rather, the DREP uses the list and integer functionality to produce a new list.

Note that the preferred embodiment of the invention is implemented in the C++ language. This implementation is not reflected in the above text. Only the information content is described.

Data Representation Calculation Functions. All derivations of class DRep have several member functions that support calculations on the information that the DRep represents. The following describes some of these member functions. Member functions for a integer DRep are not always available for a list DRep. In addition to the functions listed in this section, all DReps have functions that provide for output, duplication, construction, destruction, and in most cases, assignment.

Basic DRep Member Functions. The member functions specific to the base class DRep are the two named above, operator << and DRepType, as well as a set of virtual casting functions.

```
class DRep : public QueueElem {
protected:
    DRepValueType valueType;           // Type of data
    class DRepOueue {
    public:
        enq(DRep*);                    // enqueue
        deq(DRep*);                    // dequeue
        fiq(DRep*);                    // first in queue
        liq(DRep*);                    // Last in queue
        niq(DRep*);                    // Next in queue
        nmq(DRep*);                    // Number in queue
    public:
        friend ostream& operator<< (ostream&, const DRep&);
    DRepValueType DRepType(const DRep&);
                                       // Returns Type of DRep
}
```

Additionally, queue commands are available to the type specific classes derived from the base DRep class. A special class derived from the DRep class serves as a queue utility to system elements outside of DReps.

Integer Member Functions. The following basic math functions are defined for integers:

```
class DRepInteger : public DRep {
public:
    DRepInt operator+ (const DRepInt&);
    DRepInt operator- (const DRepInt&);
    DRepInt operator* (const DRepInt&);
    DRepInt operator/ (const DRepInt&);
    DRepInt operator^ (const DRepInt&);
}
```

Additional member functions may be defined in various embodiments of the invention, if needed.

List Member Functions. The following list primitives are defined for lists:

```
class DRepList : public DRep {
    void      AddToList       (DRep*);
    void AddCopyToList (const DRep&);
    void RemoveFromList (DRep*);
    DRep      ListIndex (int);
    int       ListLength ( );
}
```

More functions may be added if necessary in other embodiments of the invention.

String Member Functions. The following string primitive are defined for string type DReps

```
class DRepString : public DRep {
    DRepList operator+ (const DRepString&);    // Concatinate
    DRepList operator+ (const String&);        // Concatinate
    DRepList operator+ (char*);                // Concatinate
}
```

More functions may be added if necessary for other embodiments of the invention. Such functions may include the following:

Real Member Functions

Set Member Functions

Error Member Functions

History Member Functions

Agent Member Functions

Wildcard Member Functions

QueueOfDRep Member Functions.

Expressions and Functions

In the preferred embodiment of the invention, a facility is provided to perform calculation and manipulation of data based on expressions that are learned at run-time. This facility implements a side-effect free calculation process that can supply other modules with information derived from expressions and basic values. In the preferred embodiment of the invention, such derived information is formatted in a manner suitable for presentation to a user, although the original information is not in a desired form.

The existence of a database 44 (FIG. 3) in which values reside and from which these values can be retrieved is provided as part of the architecture of the present invention. The database is a simple table that is strictly internal to the invention. Expression evaluation has no implicit effect on the database. Histories may be based on expressions, by recording the results of expression evaluation over time, but this is considered an explicit effect.

General Features.

Implements functional expressions.

Given a function and a set of values, a result is calculated.

Functions may refer to other functions.

Leaf values may refer to MIB variables that are retrieved from the database.

Leaf values may also refer to special object properties.

A small built-in set of operations exists.

The function takes arguments that are used in specifying how the leaf values are retrieved. This could include an agent, a community string, and an instance for a MIB variable, or an object reference for an object property. These arguments may also be regular DReps for use in computation Restrictions.

All function dependencies must be directed and acyclic.

There is no explicit run time type checking.

Functions are described as special data-structures that are built by using expression building facilities (described below).

Function processing and arguments are restricted to a built-in set of value types (described below)

Supported Value Types. The following value types are supported in the Values Module: no_value, error_value, time_value, Boolean, integer_number, real_number, string, list, block, set, history.

Registration. When functions are registered a function reference is returned. The registration procedure takes an expression data-structure and returns an expression reference. This reference may be used in later expressions.

Evaluation

The present invention provides a procedure 46 that evaluates a function. This procedure takes a function reference, as well as any arguments, and returns the value of the expression corresponding to the given function. It is important to note that expression evaluation can cause other expressions to evaluate, and values to be looked up in the database. It is also important to note that the evaluation is completely functional and free of side effects with respect to the results of other functions. This is due in part because the values of MIB variables are looked up in a database rather than explicitly polled. No state changes due to an expression evaluation.

Expression Operators. Expressions consist of operators and operands. Operators can be registered functions as well as built-in functions. Built-in functions are common functions, such as 'add' and 'divide', as well as unusual system specific functions, such as DBLookUp.

Notation. The present invention adopts a Scheme-like syntax to present expressions and describe functionality in the expression module. Note that this has no impact upon the syntax chosen for use in the design specification language. This syntax is a representation for an internal data-structure.

Operators. In the invention, many operators can take several types of data. The exact semantics of the operation depends upon the data types that are given as arguments. For example, 'plus' can add two integers, or two lists. The addition of two lists results in a list whose $n^{th}$ element is the addition of the $n^{th}$ elements of the argument lists.

Expression Type. An expression is an operator and operands. The operands may be expressions, DReps, argument references, or side references. Operands are represented by the Argument class. The argument and side references specify variables in the expression context.

Data Computation

Data computation functionality is defined as the functionality associated with information retrieval, storage, and manipulation. It includes polling, expression evaluation, and event notification. The functionality discussed in this section is broken down into the following sections:

Expression Evaluation

Remote Information Retrieval

Information Storage

Event Detection

Component Update

Expression Evaluation. A facility 46 is provided for calculation and manipulation of data based on expressions that are learned at start-up. This facility implements a side-effect free process of calculation that can supply other modules with information that is derived from expressions and basic values. This derived information is suitable for presentation to a user where the original information may not be in a desired form.

The basic building block of this functionality is an expression. An expression is an operator and a set of operands. An example of an expression is (+ 3 4 5), where plus (+) is the operator and 3, 4, and 5 are the operands. This allows the DSF to manipulate information in a very powerful fashion.

A database in which values reside and from which these values can be retrieved is provided by the present invention. The database 44 is a simple table that is internal to the invention. Expression evaluation has no implicit effect on the database. Histories may be based on expressions, recording the results of expression evaluation over time, but this is considered an explicit effect.

Functions may be defined in the DSF. These functions are based upon an expression and take a specific number of arguments. Once a function is defined, it may be used as an operator in expressions (which may also be made into functions).

General Features.

Implements functional expressions.

Given a function and a set of values, a result is calculated.

Functions may refer to other functions.

MIB variables may be referenced that are retrieved from the database.

The values of User Interface Component attributes may be referenced in expressions.

A small built-in set of operations exist

Restrictions.

All function relations must be directed and acyclic.

There is no explicit run time type checking

Supported Value Types. The following value types are supported for computation:

no_value. The values of expressions are based on the values of external data that is sampled through polling. Thus, there are times when expressions may result in a no_value. This indicates that the data that is necessary to compute the value of a function is not available.

error_value. The sampling of external data through a protocol module may result in errors that are specific to the sample attempt. An example of this is the SNMP NO_SUCH_NAME error. If an error such as this occurs, then the value type of the sample becomes error_value. An error_value type has a value indicating the nature of the error.

time_value. Data samples are stamped with a sample time such that two different samples may be compared in a meaningful way. A time_value is used to record the sample time.

Boolean. A Boolean can represent either true or false.

integer_number. An integer_number represents an integer with at least 32 bits precision.

real_number. A real_number is a float type with 64 bit precision.

string. A string is a set of ASCII text, Note that this type supports sixteen bit characters in international versions of the invention.

list. A list is an ordered collection of zero or more values of any type.

block. A block is an array of octets of a known length.

history. A history is a record of sample values of an expression over time. It may trade historical granularity for storage space. It maintains certain statistical information including average and variance.

agent. An agent type describes an agent to query for MIB information. This contains the agent address, type, and community string. It is taken as an argument by the operator DBLookUp.

Evaluation

A mechanism is provided in the present invention for evaluating a function. This mechanism takes a function reference, as well as any arguments, and returns the value of the expression corresponding to the given function. Evaluation can cause other functions to evaluate, and values to be looked up in the database. The evaluation is completely functional and free of side effects. Thus, the values of MIB variables are looked up in a database rather than explicitly polled. No state changes due to an expression evaluation.

Expression Operators. Expressions consist of operators and operands. Operators can be defined functions, as well as built-in functions. The built in functions are those commonly used, such as add and divide, as well as unusual functions that are specific to the invention, such as DBLookUp.

Math

Plus (+). Adds two or more values. These values may be numbers or lists. In the case of lists, each $n^{th}$ element of the list is added to other $n^{th}$ elements to result in a list.

Example: (+ 4 5 3)

Minus (−). Subtracts two or more values with the same structure as plus.

Example (− 4 5 3)

Multiply (*). Multiplies two or more values.

Divide (/). Divides exactly two values.

Absolute (abs). Results in the absolute value of a number.

Modulus (mod). Results in the remainder of the division of two numbers.

Power (^). Takes two numbers, and results in the first number taken to the power of the second number.

List gen_list. Takes zero or more values, and results in a list with the given values as the elements.

index. Takes a list and an integer n, and returns the element in the $n^{th}$ position.

length. Returns the length of a list.

String match (regular expressions). A regular expression can be specified that is applied to a given string. If the expression matches the string, then the result is a Boolean value true. Otherwise the result is false. A side effect of setting special variables can occur if the regular expression specifies that the sub-string matching sub-pieces of the expression are to be saved. This is similar to the scheme used in perl. This allows a string to be parsed, and the components referred to later in the expression.

cat. Cat takes two or more strings and returns an ordered concatenation of all of the strings.

substring. Substring takes a string and two numbers. The numbers specify the start and end position of the sub-string to extract in the given string.

length. Length takes a string and returns the length in characters.

Control cond. Takes one or more two element lists as arguments. The elements of the list are two expressions. Cond evaluates each expression that is the first element of each list, until one of these expression evaluates to something other than false. Then, the expression that is the second element of the list is evaluated, and the result of the operator is the value of that expression.

Example: (cond ((= 3 4) (+ 1 2)) ((= 3 3) (+ 4 5)))

Result: 9 or. Takes two or more expressions as arguments. Or evaluates these expression sequentially until one expression is not false. This operator's result is the first expression to evaluate to something other than false. If all the expression evaluate to false, the result of the or is false.

sequential. Evaluates one or more expressions in order. Each is evaluated, and the entire expression takes the value of the last expression.

and. Takes two or more expressions as arguments. And evaluates each expression sequentially until one expression is false. If any expression is false, then the and results in false. If no expression evaluates to false, the result is the value of the last argument.

Statistics variance. The variance for a history type or a set of numbers is available.

average. The average for a history type or a set of numbers is available.

Miscellaneous Operators

DBLookUp. This operator looks up a value in the database. For example, a MIB variable for which polls at some point have been enabled. Another is a history which has been explicitly defined. Additionally, it could be a value that a UI component sets. The arguments of this operator describe what to retrieve from the database. Arguments can be wildcarded that return a list of values.

TimeStamp. This returns the time value of the period in which a sample was taken. It is consistent across all agents, thus it is useful for calculating rates. It only works with values retrieved from the database. (This includes any elements of a history). Values that are derived from several database objects do not have time stamps. Values that are derived from exactly one database object have the original timestamp.

Argument Class. The argument class represents three distinct types of values: expressions, constants (DReps), and variable references. There are three types of variable references: local, argument, and side variables.

```
enum ArgType
{ArgRef, ArgLocal, ArgSideRef, ArgExp, ArgDRepy};
union ArgVal {
public:                      // Or Private?
   Expression    *pExpression:
   DRep          *pDRep;
   int           ref;
}
```

The union ArgVal is used only in the class argument. The following is an example of the Argument class.

```
class Argument {
private:
ArgType          argType;
ArgVal           argVal;
}
```

The argument class is used to represent all of the possible argument values in an expression. The values may be another expression, a primitive (DRep), or a variable reference.

Expression Class

```
class Expression {
private:
    ID          idOperator;         // Operator to execute
    int         cArgs;              // Number of Arguments
    Argument    *prgArguments[ ];   // Array of Arguments
}
```

Expression Operations. The following operations are public for the argument and expression classes.

Argument Functions. In the preferred embodiment of the invention, arguments must be created and evaluated. The following constructors create arguments:

Argument(Expression *);

Argument(DRep *);

Argument(VarType,int/* reference */);

The following member function evaluates an argument to provide a result in a DRep:

DRep* Evaluate(ExpCntx&);

Expression Functions. In the preferred embodiment of the invention, expression functions must be created and evaluated. The following constructors create an expression:

Expression(OperatorID, QueueOfArgs&);

The following member function evaluates an expression:

DRep* Evaluate(ExpCntx&);

Expression Context. The expression context is a set of information that is unique to a particular evaluation of an expression. The context contains the values of all arguments and side references that are used in the expression. Thus, the context is considered the stack frame for the expression.

Expression Context Class. The following describes the information maintained by the expression context class:

```
class ExpCntx {
private:
    int     cArgs;              // Number of arguments
    int     cSide;              // Number of side refs
    int     cLocal;             // Number of local refs
    DRep    *prgDRepArgs[ ];    // Pointer to array of arg values
    DRep    *prgDRepSide[ ];    // Pointer array of side values
    DRep    *prgDrepLocal[ ];   // Pointer to array of local vars
}
```

The count of the argument, side, and local variables, as well as the array pointers, are set at the time the instance of ExpCntx is created.

Expression Context Operations. In the preferred embodiment of the invention, expression context must be created, set, and accessed during evaluation. The following constructor creates an Expression Context:

ExpCntx(QueueOfArguments&, int countSide, int countLocal,);

The following functions access the information stored in the expression context:

void ClearVars();//Clears local and sides for new evaluation void SetVar(VarType/* local or side */, int, DRep*);

DRep* GetVar(VarType/* local, side, or arg */, int);

Function Type. A Function is an operator that has no supplied arguments. It is a registered expression. A Function has its' own expression context for evaluation, and it can be used as an operator referring to its' function identifier when constructing expressions. A Function is represented by ExpFunc.

Class Description. The following structure describes some of the information maintained by an ExprFunc:

```
class ExpFunc {
private:
    ID          funcID;         // Identifier of function
    ExpCntx     *pExpCntx;      // Context used during eval
    Expression  *pExpression;   // Expression for function
                                // For Built in funct is null
}
```

Additional information is necessary to lookup and retrieve these by items by identifier. In the preferred embodiment of the invention, they are placed in a hash table.

Function Operations. In the preferred embodiment of the invention, functions must be created and evaluated. The following constructor builds a function:

ExpFunc (Expression*);

The constructor analyzes the expression for argument, local, and side references to determine how large the arrays in ExpCntx need to be. An ExpCntx is allocated and a FunctionID is then assigned.

A DSL parser is necessary to retrieve the ID of the ExpFunc. The following member function provides a DSL parser:

FuncID GetID();

A function may be evaluated with the following member function:

DRep* Evaluate(QueueOfArgs*);

Mapping of function names to function ID is a utility in the DSL parsing module. The function name refers to the identification used in the DSL, e.g. an integer, string, etc.

Evaluation

The evaluation process is divided into three functions. The first function, EvalFunc, evaluates a function. The second function, EvalExp, evaluates an expression. Finally, the function EvalArg evaluates an expression argument. The EvalFunc has an associated function and a list of arguments. The EvalExp has an Expression and a context in which to evaluate that expression. The EvalArg function takes an Argument as well as an ExpCntx.

```
ExpFunc:: DRep& EvalFunc(ExpFunc&, ArgQ)
{
// Copy Arguments into ExpFunc.pExpCntx.prgDRepArgs
// Eval Expression: ExpFunc.pExpression
}
```

```
Expression: DRep& EvalExp(Expression&, ExpCntx&,
optional DRep&)
{
// Check if operator id is a built in type
// If not, EvalArg each argument in order, build ArgQ
// EvalFunc with argument list
}
```

Argument: DRep& EvalArg(Argument&, ExpCntx&, optional DRep&)

```
{
// If argument is a DRep, just return the DRep value
// If the argument is an argument ref, return from ExpCntx
// If the argument is a side ref, return from EcpCntx
// Otherwise, it is an expression, EvalExp( )
}
```

EvalExp collects sets of ReadProp and MibLookUp operators. This mechanism determines dependencies for the Update module when supporting Notification Requests. Collection is enabled and disabled by calls to Expression member functions.

Expression Tree Building. The preferred embodiment of the present invention, provides a facility 48 (FIG. 3) to build trees of expressions suitable for use in the expression evaluation section. This facility includes a set of calls that build a data structure. The procedure for building an expression tree is as follows: build the operands, then build the expression by specifying the operands and the operator. This is a bottom up construction method.

General Features include a call that converts a reference to a MIB object to an expression component; and a call that converts data known at expression build time to an expression component.

Building an Argument. The preferred embodiment of the invention provides a call that converts a reference into a function, and that converts a list of expressions that function as operands into an expression.

Builder Functions. The following are the functions that are used by the device specification language to build functions:

ExpFunc RegisterFunction(Expression*)

```
{
// Allocate ExpCntx
// Allocate ExpFun
// Scan expression for largest: argref, sideref, localref
// Allocate ExpCntx.prgDRepArgs
// Allocate ExpCntx.prgDRepSide
// Allocate ExpCntx.prgDRepLocal
// Set pointers
// Enter function into function table
// Return ExpFunc
}
```

Expression MakeExpression(ID funcID, List of Argument);
The following functions are Argument constructors:
Argument MakeArgument(DRep*)
Argument MakeArgument(Expression*)
Argument MakeArgument(int,ArgRefType)
enum ArgRefType {LocalRef, ArgRef, SideRef}
enum BuiltInFuncID {Fid_Plus,Fid_Minus, . . . }

Synchronous Update Module

The present invention requires that a synchronous update submodule 50 (FIG. 3) control the values module 20. The sub-module ties all of the values functionality together, enables the polls, and drives the update of the expressions for interested objects. A synchronous restriction in the sub-module provides a type of functionality that orders and optimizes the asynchronous behavior of the polling and database updates. Thus, instead of notifying a graphical component every time an event occurs that could effect the state of the component, the component is notified, at most, at a specified rate.

General Features.

An interested module or object can register a callback based upon a change in a given value or a set of values.

A rate is given with the callback that expresses the maximum frequency of the invocation of the callback. This feature drives the synchronous nature of the module.

In the case of a set of values, a callback can be invoked when any or all values change.

Restrictions.

No order of updates is defined. There is no way to ensure that one component gets updated before another.

If traffic from the engine is too heavy, the update may not occur at the rate expected.

If the load on the processor is too heavy, the updates may not occur as frequently as expected.

No-response errors are considered to be a no-change event for synchronous updates. Thus, if a poll does not return in the period that the information is needed for a synchronous update, the update is not postponed to wait for a poll that may not return.

Static analysis of the expression trees is necessary. Thus, some restrictions are placed on expressions. In general, acceptable expressions take naming arguments that are limited in scope and predictable in advance.

Interface. The interface has the ability to register and de-register callbacks on values and sets of values. Additionally, an update rate is specified. These callbacks receive information on those values that have changed.

Register Function. Functions are registered by calls, which take as arguments:

(Registered Expression expression,
ArgQ, callback_function, data)

and return a handle to a Registered Function.

If the number of arguments in the ArgQ is smaller than the number of arguments that the expression expects, the remaining arguments use the default values from the argument list in the registered expression.

The callback function is defined as follows:

void function_notify (Registered Function *func,
Drep *value, Opaque *data)

DeRegister Function. Functions are deregistered by calling, and then passing in the registered function handle:

```
class NotifyRec {
private:
    ID              NotifyRecID;
    ID              FunctionID;             // Function to monitor
    ArgQ            ArgQArgs;               // Arguments to function
    DRep            DRepOldVal;             // Last Value of function
    Callback        callback;               // Notify procedure
    IdList          pollList;               // Polls for this Rec
    PropValue       property;               // Specific Object-Property
                                            // Claus' contrib 4/24
    DepSet          dependencies;           // Set of Dependencies
};
enum DependType {DBValue, PropValue, NotifyRec};
union Dependency {
public:
    DBValue         dbVal;                  // Database Value
    PropValue       property;               //      Specific Object-Property
    ID              NotifyRecID;            // Property dependence
                                            //      Claus' contrib 4/24
};
class DependElem {
private;
    DependType      type;
    Dependency      element;
}
class DepSet {
// Set of DependElem
// This will depend upon the design of the
// set module (set ADT - not SNMP set).
}
```

Organization of NotifyRecs. In the preferred embodiment of the present invention, the notify request records must be looked up as follows:
  by notify id
  by dependence elements
  by property Each poll placed by the Synchronous Update Module has a single callback placed on it. If the value changed, the callback records that fact by placing a record on the synchronous event queue. A value change may also trigger an update, if one is warranted, by invoking a callback previously registered with the Synchronous Update Module.

The update cycle can not be completely driven by poll/ trap / and UI events. Therefore, some periodic checking of the event queue is necessary. These checks determine if an update is warranted.

It is possible to poll for a few critical MIB objects. If these objects meet certain conditions, additional, larger MIB objects may be retrieved to complete the expression.

Polls are disabled or removed when callbacks are de-registered. This causes polling to stop for values that are no longer important (e.g. a dialog was closed).

Calculation of Dependencies. Upon a receipt of a Notification Request, the update module evaluates the expression once with the dependency collection of the evaluation module enabled. This evaluation generates a full set of DependElems consisting of database values and object properties. For any properties that exist in the set, for which a NotifyRec also exists, a DependElem for that NotifyRec is added to the Set.

Notification of Property Changes. The present invention allows several options in this area. For example, the values module may be notified when any property changes as a result of a user action rather than as a result of a values module Event Notification. In the preferred embodiment of the invention this approach is considered more efficient than checking for notification on each property change.

Information Retrieval

A facility is provided for the orderly retrieval of remote information over time, while at the same time introducing acceptable and measurable levels of network traffic. This is based upon the expressions that User Interface components describe as currently interesting. MIB variables that are in the same expression are set up so that the poll events occur at approximately the same time.

Protocol Facility. A single protocol facility is used. All communication with remote objects is done through that facility.

Trap Reception. Traps contain information both with and without variable names. Each type of trap received maps into a data value. The variables that a trap contains are placed in the database, but, by default, have an additional instance field specifying that these were set by a trap rather than a poll. Optionally, the values may be placed in the same data sets as variables that are polled for. After this point, the trap event is identical to a polled event.

Poll Response Results. When a poll response is received, any data collected are fed into the information storage facility. Functions that reference these values, and user interface components interested in these values are notified with information describing the retrieval.

General Features. Values are stored based on a key composed of items that are dependent on the source of the data. The MIB values have a key composed of the variable name, variable instance, and agent.

The present invention provides the ability to keep histories of arbitrary functions. The registration of these histories places past samples in the database where, ordinarily, they are discarded.

Additional information can be kept with database objects that include sum and sum of squares for quick and efficient computation of statistical values.

Restrictions.

No persistent storage is supported

The calculation of statistical information over a history does not guarantee that old values are actually kept. This may be optimized for storage requirements Register History. This mechanism takes a database object and keeps a history. Available histories include ones of limited time and/or space. In general, old sample values may be combined giving less detail but more efficient storage.

Time Stamps. Time stamps are mapped into a local time reference and a remote time reference. This provides a base for measuring time for a remote agent; and an ability to translate and compare remote times with local time and the time on other agents.

Discontinuity. A period of history for a variable may not exist or may not match another period of history. If an agent dies and then resets, a set of samples are lost, counters are reset, etc. This results in certain functions taking on the value NO_VALUE. Thus, the present invention does not compute the difference between values of a variable on two different sides of the discontinuity. Accordingly, such occurrence results in NO_VALUE.

Event Detection. Event detection describes the monitoring of arbitrary functions for a change in value. These changes occur due to changes in the database and changes in component properties. Changes in the database are caused by poll results and changes in the component properties are caused by user input. This gives the engine the ability to take arbitrary internal action based on changes in the remote agent being monitored, or based on user input.

A function is monitored on behalf of a specific User Interface component. A component may want to be updated on a change to the database in order to update the information that it is displaying to the user.

Component Update. The component update describes functionality that enables the polls, and drives the update of the expressions for interested objects. A discrete behavior is defined that causes update to occur in a regular manner. Thus, instead of a graphical component being notified every time an event occurs that could effect the state of the component, it is notified at a specified rate.

Restrictions.

No order of updates is defined

If traffic from the engine is too heavy, the update may not occur at the rate expected If the load on the processor is too heavy, the updates may not occur as frequently as expected Static analysis of the expression trees is necessary, so some restrictions are placed on expressions Functions. A mechanism is provided to enable polls based on functions that are registered. Functions are associated with an expression. The expression tree can be traced in order to determine what variables need to have polls. The rate of the update dictates a minimum rate at which these variables ware polled.

It is useful to poll variables in the same expressions near the same time. If an expression has several variables in it, the variables are sampled close to each other so they replace similar time periods. However, any expressions that depend heavily on samples being taken at the exact same time are discouraged.

Efficiency Optimization.

Statistics are kept on how many polls are actually used.

Polls are disabled or removed when expressions driving these polls are de-registered. This causes polling to stop for values that are no longer important for some reason (e.g. a view was closed)

Poll Types. Polls 52 (FIG. 3) for both classes of objects and individual objects are supported. A poll can be placed on an object attribute, an object, or on an entire object class.

Registration. Polls are registered by the Update modules (both Synchronous and Asynchronous). Registration consists of an agent to poll, a MIB object to sample, and (optionally) specific instance(s), specific attributes, and poll response handlers. A poll identifier is returned from a poll registration.

Additionally, poll groups may be registered. A set of poll identifiers may be built (these polls must be previously registered) and registered as a group.

Poll in poll groups are related, such that the poll events occur at about the same time.

Protocol Facility. In the preferred embodiment of the invention, a single protocol facility is used. All communication with remote objects is done through that module.

Trap Reception. Traps contain information both with and without variable names. Each type of trap received maps into a data value. Variables within a trap are placed in the database, but have, by default, an additional instance field describing that these variable are set by a trap rather than a poll. Optionally, the values may be placed in the same data sets as polled variables. After this point, the trap event is identical to a polled event.

Poll and Access Modules

Figure 4:
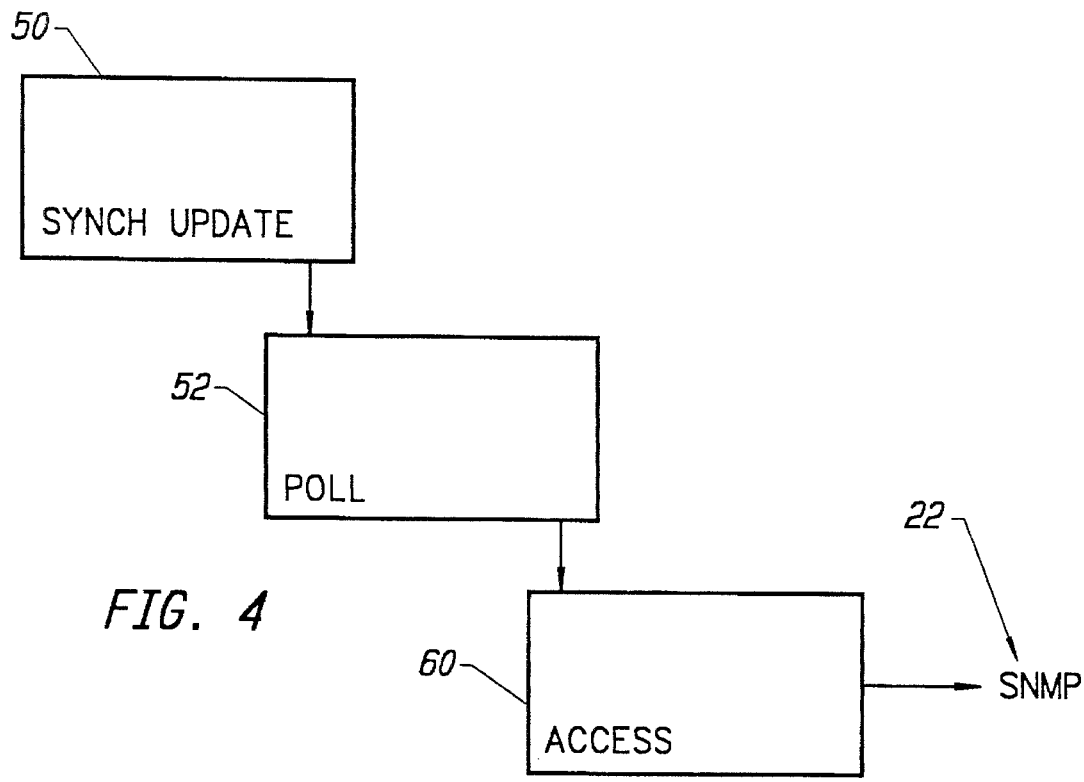
FIG. 4 is a block schematic representation of a poll architecture according to a preferred embodiment of the present invention.

FIG. 4 is a block schematic representation of a poll architecture showing the poll module 52 and the access module 60 according to a preferred embodiment of the present invention. The function of the poll and access modules is information retrieval. When a view is interested in a particular piece of information, it is the job of the polling and access layers to retrieve the information in a protocol-independent manner. The preferred embodiment of the invention employs the SNMP protocol 22.

A function specific to the polling module is the support of recurring updates. If a view is interested in a updating a value over time at a defined rate, it is the job of the polling module to periodically request this information from the remote agent.

Additionally, when configure commands are constructed, it is the job of the access layer to build an SNMP set packet and send it to the agent.

Position In System Architecture. The synchronous update module 50 determines what information each view is interested in having by examining the expressions associated with each notification request. If these expressions contain references to MIB objects, then polls for these objects are created and enabled.

The poll module 52 makes use of the access layer 60 to retrieve information. The poll module requests specific values from a particular agent, and the access layer immediately builds an SNMP packet, and hands the packet off to the SNMP layer 22. This in turn sends the packet to the agent using the Internet Protocol (IP). For purposes of the present invention, it should be appreciated that the SNMP layer is built with well known technology that is currently available in the public domain.

In summary, the synchronous update module, serving as the heart of the engine, uses the poll module, and the poll module uses the access layer, which uses the SNMP layer, which uses operating system primitives.

Poll Implementation

Poll Environment. A single global poll environment exists for a system process. The environment provides several functions, including enabled polls, the rate at which polls are recurrently sent (this is the same for all polls), and a timer for notification of when the next poll must be sent.

Poll Creation. A poll is created by calling a function associated with the poll environment. Thus, the created poll has a reference to its environment.

Poll Configuration. Before a poll can be enabled and made active, it must be configured. This configuration sets the particular MIB variables for which the poll is to retrieve. This is done by calling a member function of the poll to add a variable. The variable is identified by the object, attribute, and instance information. At least one variable must be added in this fashion for the poll to be enabled.

Poll Enabling. A poll is enabled by calling a member function for that poll. The poll then calls a member function of the poll environment that created the poll. The environment inserts that poll into its queue of polls to send, and adjusts its inter-poll send time to account for the increased load. The inter-poll send time is the number of seconds defining the system poll rate, divided by the number of enabled polls, unless the number of enabled polls is zero. In the latter case, the inter-poll send time is not set and the timer is disabled.

Poll Sending. When it is determined that it is time for a poll to be sent by the passing of an interval that is the size of the inter-poll send time, the timer invokes the poll send function associated with the global poll environment. The first poll in the "to send" queue is taken off of the queue and given to the access layer to request. At this point, the poll environment sets its timer again, and returns control to the main event loop. When the access layer responds asynchronously indicating that a poll completed, the poll is placed back on the end of the queue.

Poll Grouping. Poll can be grouped to allow all of the information on a particular window to be sampled at about the same time. The grouping behavior is implemented by inserting a poll next to another poll in the same group on the "to send" queue, if a poll of that group exists on the queue.

Poll Disabling. When a view closes, the synchronous update module disables all of the polls associated with a view. This is done by invoking a member function for the poll that call a member function of the global poll environment. This function removes the poll from the queue of polls to send.

Poll Response Results. When a poll response is received, any data collected is fed into the information storage facility. If any callbacks were specified at registration for any poll or group related to this response, these callbacks are invoked with information on the retrieval.

Information Storage. A common pool of information gathered from polls and traps is kept to maximize the sharing and availability of data. This type of facility decouples the evaluation of expressions that contain reference to MIB objects from the action of collecting the values of these MIB objects. Additionally, it is desirable to keep histories of certain data. This database is a simple table that is internal to the invention architecture. It has no correspondence to any external databases.

General Features.

Values are stored based on a key composed of items that are dependent on the source of the data. The values have a key composed of the variable name, variable instance, and agent.

The invention allows the keeping histories of arbitrary functions. Registration of these histories keeps past samples in the database, when ordinarily, they are discarded.

Additional information is kept with database objects, including sum and sum of squares, for quick and efficient computation of statistical values.

The invention stores all retrieved information including encoded and decoded instance information.

Restrictions.

No persistent storage is provided in the preferred embodiment of the invention, although such feature may be desirable and is readily added a necessary.

Calculation of statistical information over a history does not guarantee that old values are actually kept. This feature may be optimized for storage requirements.

Interface

The interface consists of several functions, including lookup, update, previous, register history, and time stamp. These functions are used by the expression evaluation module, update modules, initialization module, and by user interface components. Each function is explained below:

Lookup. The lookup function takes a unique key and returns the database object as a value type.

Update. The update function takes a key, a value, and a time stamp, and updates the latest value for that entry.

Previous. The previous function returns previous values of database objects. The number of previous samples can be explicitly stated, or a time difference from the present time can be given.

Register History. The register history function takes a database object and keeps a history. Available histories include those of limited time and/or space. Typically, old sample values are combined, giving less detail but more efficient storage. History declarations define their own instances.

Time Stamps. Time stamps are mapped into a local time reference and a remote time reference. This gives a base for measuring time at a remote agent, and provides the ability to translate and compare remote times with local time, and with the time on other agents. In SNMP, this time is sysUpTime.

Discontinuity. Occasionally a period of history for a variable does not exist or does not match another period of history. If an agent dies and then resets, a set of samples are lost, counters are reset, etc. This results in some functions taking on the value NO_VALUE. Thus, the invention does not compute the difference between values of a Variable on two different sides of the discontinuity, which would results in the return of a NO_VALUE. Other modules must understand and support this. For example, a graph displaying the rate of change must break the line over the period of discontinuity.

Structure. The database consists of a hash table with the following key: (agent, SMIObject, attribute). These are termed DBClass elements. Enqueued on these class structures are DBElems that are searched by instance. This allows iteration over all current instances of one attribute, and lookup based on Agent, Object, attribute parameters.

Database Class Structures. The following structure defines the elements placed in the hash table:

```
class DBClass : public HashElem {
    SMIObj          smiObj;
    int             Attribute;
    Agent           agentRef;
    DBElemQueue     DBElems;
}
```

The follow structure defines the structure of the DBElem module:

```
class DBElem : public QueueElem {
    Instance      instance;              // shared
    DRep*         pDrep;                 // Value
    DataHistory   history;
}
```

The following structure defines the sub-structure of DBElem, DataHistory:

```
class DataHistory : public QueueElem
    TimeStamp     oldest
    int           count;
    HistLimt      HistoryLimit;          // How to summarize
    DRepQueue     History                // Old values
}
```

The following defines an instance structure. These are shared between DBElems for efficiency.

```
class Instance {
    int           refCount
    OID           oid;                   // Not decoded
    DRepQueue                Instance;   // Decoded
    }
```

Limitations. The structure described above does not give extensive support for looking up history information. It does not keep object information together, so accessing all available current information on an object is not as efficient as might be possible.

Device Specification Language ("DSL")

The following is a description of the Device Specification Language. It should be appreciated that, although DSL is described in detail, it is not necessary that DSL be used to practice the present invention. The discussion of DSL is provided to describe the features of a programming language of the type that would be useful in practicing the present invention. Thus, the present discussion, although provided for guidance, is not intended to limit the present invention to any specific programming environment. The preferred embodiment of the invention provides 4GL, a very high level, symbolic, nonprocedural language. The present invention is described as an architecture, one feature of which is a programming language. Many suitable programming languages are known with which the present invention may be practiced, even though DSL is used in the preferred embodiment of the invention.

DSL is a block-structured functional language for describing the user interlaces in the present invention, for example for applications that retrieve, manipulate and display data. The two primary purposes of DSL are to describe the composition of a user interlace and to describe the information that is displayed in the user interface.

DSL is primarily a functional language. There are "side effects," but these are limited in scope. The notion of flow of control is mostly absent from DSL. Instead, in DSL computation happens on a continuous basis. Expressions that describe values are automatically reevaluated when necessary, i.e. when the value of a subexpression changes. If an expression refers to information kept by the agent on the managed agent, then a poll for that information is made at regular intervals. If the value returned by a poll differs from the previously returned value, then all expressions using that value are reevaluated.

Figure 5:
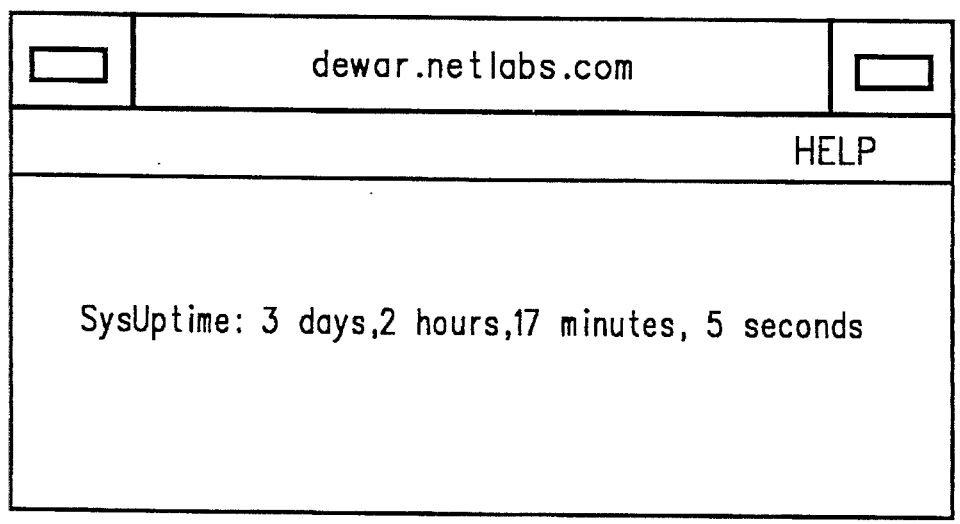
FIG. 5 is a schematic drawing of a hypothetical report view according to a preferred embodiment of the invention.

For example, consider the view shown in FIG. 5. The following is an example of how this view is described in DSL:

```
component_type UptimeView ( ) : View ( )
{
        // Property values
        Property         int              NumRows        :=5;
        Property         int              NumColumns  :=    4;
        Property {
            resid        ContextHelp                   := help:UptimeViewHelp;
            string       TitleString                   := DeviceName;
            int          Time                          :=
                            ReadMib(
                               Agent,
                               Mib1:System:sysUptime);
}
// Subcomponent
SubComponent
        TimeLabel(2, 3, Time / 100)                    Uptime;
}
ComponentType TimeLabel (
    in const int ColumnPos,
    in const int RowPos,
    in int Time ) : Label (column pos, row pos)
{
    // Property values
    Property {
        int          Days                              := Time / (24 * 60 * 60);
        int          Hours                             := (Time / 3600) % 24;
        int          Minutes                           := (Time / 60) % 60;
        int          Seconds                           := Time % 60;
        string       Contents                          := ConcatStrings (
                        "SysUptime:",
                        ItoS(Days),"days,",
```

```
            ItoS(Hours),"hours,",
            ItoS(minutes),"minutes,",
            ItoS(Seconds),"seconds");
   }
}
```

Before discussing the above view, it is important to consider how the following items are defined, created, and used in the context of the present invention: a component instance, and a component type. Although it is slightly more accurate to refer to a 'component instance', for purposes of discussing the present invention, such term shall be referred to as a 'component'.

A component is an object on the user's screen, such as a view, a label, a button, etc. Every component has a corresponding component type that defines the component as a particular object (e.g. label, button, etc.). Type also determines aspects of the component's appearance, such as its' color, size, and location.

Some kinds of components, e.g. views, may contain other components. Components which contain other components are referred to as composite components, or 'composites.' The components contained within the composites are referred to as either children or subcomponents of the composite. The component type of a composite describes the number and kinds of children it contains.

The process of creating a component from a component type is called instantiation. The process of instantiation is somewhat complicated, mostly because of composites. When a composite is instantiated, it causes its children to be instantiated. When it does this, it can give information to, and get information from, its children.

A component keeps information it needs in component properties. A component property is analogous to a local variable in an ALGOL procedure or function. That is, a property is a piece of information that a component keeps, and can look at and change by giving the name of the property.

The example view of FIG. 5 consists of two components: a view (or dialog) and a label within the view. The two type descriptions correspond to the view and the label. There are a number of things that may be specified in a component type, although some things must be specified. The following is a minimal type definition which includes everything that must be specified for a type:

ComponentType T ( ): Label () { }

The keyword Component. Type indicates that it is a component type definition. The next thing after the keyword is the name that will be used to refer to this type. Following the name of the type is a list of parameters. Parameters are the mechanism by which composites and their children communicate. A type is not required to have any parameters (in the example above, 'T' does not have any parameters).

After the parameter list is a colon and another name. This is the name of the predefined base type upon which T is built. The base type determines the kind of graphic object that is created for components of type T. The base type also has the effect of providing components of type T with a number of predefined properties. The predefined properties have special meaning in the architecture of the present invention: the value of a predefined properly determines an aspect of a component's appearance or behavior.

The base parameters are values passed as parameters to the type that serves as the base type. The expressions that are given for these parameters set the value of the properties that are defined in the parameter list. This is identical to the situation where parameters are passed to a sub-component. This allows the same definition to be used as a subcomponent and a base type.

Following the base type specifier is the type body, which is enclosed in braces. The present example, provides only the required elements and does not contain any information in the type body.

The optional parts of a definition make the resulting type useful. These optional parts include the parameters. As parameters appear in two places and do different things in each place, it is useful to distinguish between them. The parameters found at the top of a type definition are called formal parameters. Parameters appearing within a subcomponent definition (described below) are called actual parameters.

Parameters allow a parent and child component to share information. Parameters that allow the parent to give values to the child are called 'in' parameters, and parameters that do the opposite are called 'out' parameters. A formal parameter is almost indistinguishable from a property. However, an 'in' parameter is read-only for the child.

An 'in' parameter is either const or dynamic, with the default being dynamic. When a parent specifies values for the parameters of a child, it does so by giving an expression for each parameter. These expressions are the actual parameters. The expressions given by an UptimeView to its TimeLabel child are: 2, 3, and Time / 100. The value of a const 'in' parameter is fixed at instantiation time, i.e. The child's parameter has the same value for the lifetime of the child, even if the value of the corresponding expression in the parent changes. A dynamic 'in' parameter always has the same value as the parent's expression, even if the value of the parent's expression changes.

Each parameter has an associated data type, such as int, real, string, etc. After stating whether a parameter is in or out, const or dynamic, the data type of the parameter is defined, followed by the parameter's name.

The predefined base type gives a component type a number of predefined properties. These predefined properties are set by defining a formal parameter having the same name as the component type. For the TimeLabel type, two predefined properties are set this way, ColumnPos and RowPos. TimeLabel has these properties because its' base type is Label. Once a label is created, it is not allowed to move around. Thus, both ColumnPos and RowPos are defined to be const parameters. The third parameter, Time, is not predefined by the Label base type. This parameter is not const. Thus, as the value of Time / 100 changes in the UptimeView, the value of Time changes in the TimeLabel.

Several kinds of things can appear in the body of a type definition. In the example shown, UptimeView has property definitions and a subcomponent definition. TimeLabel has only property definitions.

A property definition gives the name, type, and sometimes the value of a property. Properties are defined singly or in groups. As with parameters, a property definition names a predefined property. A defined property may be referred to anywhere within the body. Circular definitions are not allowed.

The UptimeView definition has a Time property, in addition to those properties defined by the View base type. The TimeLabel definition has the predefined properties as are provided by the Label base type, plus the properties Days, Hours, Minutes, and Seconds (and the Time property, due to the parameter list).

The TitleString property (predefined by View) of an UptimeView is set to DeviceName. DeviceName is not defined in the parameter list or in the body of UptimeView, nor is it predefined by the View base type. A name which is not 'locally' defined must be defined somewhere else. In this example, the definition of DeviceName has not been shown. A name defined 'elsewhere' is said to be globally defined. A global property does not have to be defined before it is referenced.

In UptimeView, the properties NumRow, NumColumns, ContextHelp, and Time are locally defined (Time by a property definition and the others by the View base type). The ContextHelp property is set to refer to a portion of help text. The Time property is set to be the result of retrieving a value from an SNMP agent supporting MIB I. Again, some names are not defined, e.g. Agent and Mib1:System:sysUptime. The expression for Time retrieves the value of sysUptime from an SNMP agent. It is important to note that sysUptime changes over time. Because of this, the value of the expression changes, and the value of the Time property changes.

Another thing that can appear in the body of a type definition is a subcomponent definition. In a subcomponent definition, the component type being defined has a child component of a certain type. The type cannot be a predefined base type. Expressions for the actual parameters are given in the definition. Any expression may be given for a child's 'in' parameter. For an 'out' parameter only a property name may be given. The definition of a property given as an 'out' parameter may not specify a value for the property; its value is determined by the child. The property takes on whatever value the child puts into its 'out' parameter.

An optional name may be given after the actual parameters are set. This name is used only when the system is running in DSF-debug mode, and is attached to a debugging output of the subcomponent.

Whether or not a component type can have subcomponents is determined by its base type. The Label base type does not support subcomponents. Thus, it is an error to declare subcomponents for TimeLabel.

In the example shown in FIG. 5, the TimeLabel child has a value of 2 for its ColumnPos parameter, 3 for its RowPos parameter, and Time / 100 for its Time parameter. It is important to distinguish between the Time property in the UptimeView and the Time property/parameter in the Time-Label. Even though they have the same name, they have different values. When Time appears in the Uptime View definition, it means:

'ReadMib(Agent, Mib1 :System:sysUptime)';

and when Time appears in the TimeLabel, it means whatever expression its parent gave it in its parameter list, which is:

'ReadMib(Agent, Mib1:System:sysUptime) / 100' in this case. Since the Time parameter of TimeLabel is dynamic (the default), it changes as the Time property of the UptimeView changes.

A TimeLabel takes its Time parameter and processes it to turn a number of seconds into a user friendly presentation. Doing this requires that the invention first perform divisions and modulo arithmetic, then take the resulting numbers and turn them into strings, and finally take all of the strings and glue them together along with some extra strings to better describe the numbers. The present invention provides a number of predefined functions for performing a number of different data manipulation operations.

In the following discussion in this document, the syntax of DSL uses a variant of BackusNaur Form. Brackets ([]) are used to indicate that something is optional. The Kleene start (*) is used to indicate 'zero or more.' The plus symbol (+) is used to indicated 'one or more.' A vertical bar (I) indicates alternatives. To represent the empty string, we use <empty>. Keywords and other items that appear verbatim in the DSF are written using a bold font.

High Level Constructs. DSL defines a number of language constructs that are used in the description of a user interface. The following is a list of these constructs, along with brief descriptions. They are described more fully in the sections that follow.

1. Component Type Definition
2. Property Definition
3. MIB Definition
4. Menu Definition
5. Resource Definition
6. Value Definition (Expression)

Component type definitions describe pieces of the user interface. An intuitive definition of 'piece' is any item on the screen that can be isolated and talked about independently of the other items on the screen. Thus, a piece can be a view, a button, a label, etc. It is not intended that the individual characters in a label be considered components of the user interface, and it would be overkill to have a component type definition for each character in a label.

Property definitions describe a value to be calculated and updated by the engine, and assign a name to the value so that it can be referenced in the definitions of other values.

MIB definitions describe a collection of information kept by a management agent. A name is assigned to the collection (e.g. MIB I), to subgroups within the collection (e.g. System), and to pieces within a subgroup (e.g. sysUptime). An individual piece of information can be referred to by naming the collection, subgroup, and piece.

Menu definitions describe a set of menu choices and associate a 'tag' with each choice. Component type definitions associate an action with a tag. When a menu choice is made, the corresponding action is performed. This behavior is procedural, not functional, but the kinds of actions that can be taken are predefined and new kinds of actions cannot be added.

A resource is a system-dependent piece of information used by the invention. There are five kinds of resources: color, font, pixmap, string, and help text. A distinguishing characteristic of resources is that it must be possible to change them without changing the DSF or the engine. For example, strings need to be changed for internationalization purposes.

Value definitions are expressions which operate on data. The data may be raw, i.e. retrieved from a management agent or from the user, or it may be synthetic, i.e. The result of evaluating a complex expression. Value definitions allow the invention to take raw, low-level data and derive synthetic data with high semantic content.

Component Type Definition. This is one of the more complex of all the DSL constructs. The EBNF for a component type definition follows.

| | | |
|---|---|---|
| 1. compdef | = | componenttype comp-head comp-body |
| 2. comp-head | = | <name> (formal-params) : basetype (actual-params) |
| 3. comp-body | = | {body-element*} |
| 4. basetype | = | view I mainview I configview I |

-continued

```
                     graphview I label I text I graph I
                     list I table I optmenu circle I
                     rectangle
 5. formal-params  = <empty> I fparam-list
 6. fparam-list    = fparamlist, fparam I fparam
 7. fparam         = inparam I outparam
 8. inparam        = in param-class <type> <name>
 9. outparam       = out <type> <name>
10. param-class    = <empty> I constl dynamic
11. body-element   = prefetch I menu-ref I prop-def I
                     subcomp-def view-action I config-
                     action I with-element
12. with-element   = with with-prefix with-body
13. with-prefix    = <name> I <name> : <name>
14. with-body      = body-element I {body-element*}
15. prefetch       = prefetch prefetch-body
16. prefetch-body  = prefetch-elem  I {prefetch-elem*}
17. prefetch-elem  = read- agent, [instance I list]) ;
18. menu-ref       = menu menu-ref body
19. menu-ref-body  = menu-ref-elem I {menu-ref-elem*}
20. menu-ref-elem  = <name> ;
21. prop-def       = property prop-def-body
22. prop-def-body  = prop-def-elem I {prop-def-elem*}
23. prop-def-elem  = <type> <name> := expression ; I
                     <type> <name> ;
24. subcomp-def    = subcomponent subdef-body
25. subdef-body    = subdef-elem I {subdef-elem*}
26. subdef-elem    = subdef I cond-subdef I iter-subdef
27. subdef         = <name>(actual-params) [ <name> ] ;
28. cond-subdef    = when (expression) subdef
29. iter-subdef    = over (expresion) subdef
30. actual-params  = <empty> I aparam-list
31. aparam-list    = aparam-list, aparam I aparam
32. aparam         = expression
33. view-action    = action action-body
34. action-body    = action-elem I {action-elem*}
35. action-elem    = <name> <name> (actual-params) ;
```

As described above, a child's access to its 'in' parameters is read only, and a parent must give a properly name when the corresponding property in the child is an 'out' parameter.

All pieces of a body are distinguished by beginning the definition of the piece with a descriptive keyword, e.g. Property, Prefetch, etc. All definition syntax provide a similar format in that a single thing may be defined, or a group of things can be defined by putting them after the keyword and enclosing them in braces.

The value of a property is defined either by the expression given in the property definition, or by the fact that it is given to a child component as an 'out' parameter. A property's value may only be defined once—it is an error to have more than one definition, and it should at least be a warning if it has no value definition.

Parameters to a child that are in const must have a valid value before the instantiation of the child can proceed. This may delay the instantiation process if MIB values are passed to a child as in const parameters, or if a child passes such values to its own children. The profetch construct allows the DSF to identify a collection of MIB data that should be retrieved when instantiation of a component is initiated. By prefetching the data, the instantiation process may be streamlined.

As with actions driven by menu choices, the only kind of action supported for default actions is opening of a new view. Actions allow a component to initiate the opening of other views. Parameters may be passed to the view to be opened. Because there is no guarantee that the opened view exists for the same length of time as the component which opened it, parameters to view components may not be 'in' dynamic or 'out'.

Subcomponents can be regular, conditional, or iterative. A regular subcomponent is similar to the TimeLabel subcomponent in the first example. A conditional subcomponent definition begins with the keyword 'when'. The keyword is followed by a parenthesized expression that takes on a value of either TRUE or FALSE. If the expression evaluates to TRUE, the subcomponent and its descendants are instantiated as if it were a regular subcomponent. If the expression evaluates to FALSE, the subcomponent is not Instantiated.

An iterative subcomponent definition begins with the keyword 'over'. Following the keyword is a parenthesized expression that takes on a list value. A child is created for each element of the list. Within the expressions for actual parameters, two special Identifiers may appear, IterValue and Iteration. IterValue Is the value of the list element corresponding to the child, and Iteration is the position of IterValue in the list. For example, to modify the initial example to create several TimeLabels within the view, one could do this:

```
ComponentType UptimeView ( ) : View ( )
{
    // Property values
    Property    int        NumRows        := 5;
    Property    int        NumColumn      :=4;
    Property {
        resid    ContextHelp:=   help:UptimeViewHelp;
        string   TitleString:=   DeviceName;
        int      Time           :=
                        ReadMib(
                                Agent,
                                Mib1:System:sysUptime);
    }
    // Subcomponents
        SubComponent
        over (2 3 4)
            TimeLabel(2, IterValue, Time / 100) Uptime;
}
```

The list for iteration is typically a list of SNMP instance values. Special value iteration is used to determine positioning of the individual children.

Note that 'out' parameters have a special meaning for iterative subcomponents. The property given by the parent takes on a value which is a list of values. with the $N^{th}$ child determining the $N^{th}$ value in the list.

Property Definition. As seen, property definitions can appear inside the body of a component type definition. They can also appear outside of a component type definition, in which case a global property is defined. The DeviceName referred to in the first example is such a property. The syntax is the same as for property definitions occurring within a component type definition.

MIB Definition. MIB definitions allow the designer to use things, such as Mib 1 :System:sysUptime in expressions.

Menu Definition. There are option menus and pulldown menus. Option menus are a type of component. To place an option menu in a view, the DSF adds a subcomponent definition to the view's type. Pulldown menus are handled differently because they are transitory and used differently than option menus. For a view or graphic subcomponent to have a menu, a menu reference is used.

Option Menus. An option menu for an enumerated value is defined as an example:

```
componenttype OperStatOpt(
        in const int ColumnPos,
        in const int RowPos,
        out menu_tag CurrentChoice) : OptionMenu
{
        Property Choices                         := {
                "Up",             status_up,
```

```
      "Down",          status_down;
      "Test",          status_test;
}
//predefined property CurrentChoice is one of status_up,
// status_down, or status_test depending on the setting
// of the menu
}
```

Pulldown Menus. Pulldown menu definitions are relatively simple. They give a list of pairs, where the first item in each pair is the string to be displayed in the menu for a choice, and the second item is the menu tag associated with the choice. A menu definition also gives the name of the menu for when its used in a menu bar. The choices appear in the menu in the order they are given in the list. The first item in a pair can be the reserved word no_choice, which places a menu divider in that position. For this usage, the DSF should provide the reserved word no_tag for the tag.

```
37. menu-def    =   menudef <name> <string> {choice-list}
38. choice-list =   choice-list , choice | choice
39. choice      =   <string> , <name>       |
                    no_choice, no_tag
```

An example menu definition follows:

```
menudef   mymenu "Simon Says" {
    "StandUp",        stand,
    "Sit Down",       sit,
    no_choice,        no_tag,
    "Go Home",        bail
}
```

```
componenttype MenuView ( ) : View {
    menu mymenu;
    action {
        stand    UptimeView( ) ;
        sit      MenuType( );
        bail     BailView( );
    }
}
```

Certain component base types allow a type to have menu references. The base types supporting menu references are: view, mainview, configview, circle, rectangle. The graphview base type does not support menu references. The compiler flags a menu reference appearing in the body of a type definition whose base type does not support menus as an error.

When a component references a menu, it defines actions for that menu's tags. MenuView, above, opens an UptimeView when the user chooses "Stand Up" from the menu. If "Sit Down" is chosen, another MenuView is opened, etc.

Resource Definition. So far, five different types of resources have been identified. These are: color, font, pixmap, string, and help text. Each of these is handled in a slightly different way.

Strings are handled by using them. Part of the DSF compilation process extracts all the literal strings from the file and replaces them in the compiled DSF with an integer identifier. The strings are written to a separate string resource file along with their identifying integer. This file may be edited. Thus, this design simplifies internationalization.

Colors and fonts can be specified within the DSF, colors using RGB values (although HSV may be used in some embodiments of the invention) and fonts using a string naming the font. A name can be associated with a color or a font, and can be used to set certain predefined component properties, e.g. forecolor, backcolor, font. The syntax of such an assignment requires that the name attached to the color (font) be prefixed with the reserved word font (color) and a colon, for example:

```
                Property ForeColor  :=   color:red;
40.  colordef       =   color color-body
41.  color-body     =   color-elem | { color-elem* }
42.  color-elem     =   <name> <string> ;
43.  font-def       =   font font-body
44.  font-body      =   font-elem | { font-elem* }
45.  font-elem      =   <name> <string> ;
```

Expressions. The power and flexibility that the Device Specification Language (DSL) possesses is due, in part, to the use of expressions. Expressions allow a user of the DSL to describe manipulations of data collected from remote agents. Elements of Expressions include Functions, Values, and Variables, including Argument Variables, Local Variables, and Side Effect Variables. Function Declaration Syntax:

```
46.  Function      = func type <name> (args) {
                         var-decls
                         statements
                     }
47.  var-decls     = <empty>                    |
                     var-decl ;                 |
                     var-decl ; var-decls
48.  var-decl      = type <var-name>            |
                     type <var-name>, var-names
49.  var-names     = <var-name>                 |
                     <var-name>, var-names
50.  statements    = <empty>                    |
                     statement ;                |
                     statement ; statements
51.  args          = arg                        |
                     arg, args
52.  arg           = type <name>                |
                     const type <name>
53.  type          = int                        |
                     list                       |
                     string                     |
                     real                       |
                     block                      |
                     agent                      |
                     Boolean                    |
                     system
```

The system type can be one of several different types. These types are colors, fonts, pictures, and sections of help. In general these values can not be manipulated, and there are a few specific built in functions that take these.

Statements.

```
54.  statement     =  if (expression) {
                          statements
                      }
55.  statement     =  if (expression) {
                          statements
                      } else {
                          statements
                      }
56.  statement     =  <name> = expression
57.  statement     =  cond (expression) {
                          sub-cond
                      }
58.  sub-cond      =  cond-case |
                      cond-case sub-cond
59.  cond-case     =  [expression] : statements;
```

-continued

| 60. | statement | = | return expression |

Expressions.

| 61. | expression | = | (expression) |
| 62. | expression | = | expression bin-op expression |
| 63. | expression | = | un-op expression |
| 64. | expression | = | <func-name> (func-args) |
| 65. | func-args | = | expression \| |
| | | | expression, func-args |
| 66. | expression | = | <local-var-name> |
| 67. | expression | = | <side-var-name> |
| 68. | expression | = | <arg-var-name> |
| 69. | expression | = | mib:object:attribute \| |
| | | | :object:attribute \| |
| | | | :attribute |
| 70. | expression | = | pix:<pix-name> |
| 71. | expression | = | font:<font-name> |
| 72. | expression | = | color: <color-name> |
| 73. | expression | = | help:<help-tag> |
| 74. | expression | = | real-num \| |
| | | | "characters" \| |
| | | | int-num \| |

Examples

```
func real Calc-Tax(int a, int b)
{
    int x, z;
    real y;
    x = a + b;
    y = .06;
    return (x * y) + x;
}
func string Trans-State ( int state )
{
    cond (state) {
        [:system:Up] :
            x = "Up";
        [:system:Down]) :
            x = "Down";
        [default]]:
            x = "Don't know";
    }
    return x;
}
```

Built-In Operators. Operator precedence follows the standard C language definition.

Binary Operators:

— <int> : <int> + <int>
— <real> : <real> + <real>
— <real> : <int | real> / <int | real>
— <int> : <int> — <int>
— <real> : <real> — <real>
— <int> : <int> * <int>
— <real> : <real> * <real>
— <int> : <int> % <int>
— <real> : <real | int> ^ <real | int>
— <Boolean> : <any> == <any>
— <Boolean> : <Boolean> && <Boolean>
— <Boolean> : <Boolean> | | <Boolean>

Unary Operators:

— <int> :— <int>
— <real> :— <real>
— <Boolean> ! <Boolean>

Functions:

— <varibale> rate-( agent, [instance | list])
— <variable> read-( agent , [instance | list])
— <variable>avg-( agent , [instance | list])
— <list> list ( any )
— <string> ItoS( int )
— <int> StoI ( string )
— <string> RtoS ( real, string )
— <real> StoR ( string )
— <any> index ( list)
— <string> sub-str (string, int, int)
— Timestamp Available Component Base Types. The available built-in types are:

1. Main View
2. View
3. Graph View
4. Label
5. Text
6. Graph
7. List
8. Table
9. Circle
10. Rectangle
11. Menu
12. Option Menu
13. Config View Component Positioning. Main Views, Views, Graph Views, Circles, and Rectangles can have subcomponents. The subcomponents are positioned in a coordinate system defined by the parent.

Circles and rectangles support a coordinate system based on pixels. The coordinate system defined by a circle is such that the center of the circle is at (R,R), where R is the radius of the circle in pixels. The coordinate system defined by a rectangle has its origin at the lower left hand corner of the rectangle.

The views (main, regular, and graph) support two types of coordinate system: pixel and RowColumn. Pixel positioning is absolute and not affected by resizing of the view. If a subcomponent is pixel-positioned at (0,0), then the lower left hand corner of the subcomponent always appears in the lower left hand corner of its parent.

When using the RowColumn coordinate system, the view is sectioned into a matrix of cells. The view always has the same number of rows and columns, even when resized. The width of a cell (in pixels) is the width of the view (in pixels) divided by the number of columns. Likewise, the height of a cell is the height of the view divided by the number of rows.

Subcomponents within the view can be positioned by specifying the Row and Column. The lower-left hand corner of the subcomponent will be located at the lower-left hand corner of the cell specified by Row and Column.

Main View. The main view is used for the "front panel view". This built-in type has no buttons. It does have special features, e.g. activity indicator and workbench. This view always has a menu bar with a Help menu in it. The Help menu contains the choices: Help on NetLabs/CCM, Help on Window.

| Property | Description |
| --- | --- |
| ForeColor | |
| BackColor | |
| Font | not used, but can be read by children |
| WorkbenchFont | font used in the workbench |
| TitleString | sets string in title bar |
| NumRows | for defining # of rows in RowColumn coord system |
| NumColumns | for defining # of columns in RowColumn coord system |
| Width, height, xpos, ypos | specify geometry and placement |

View. The view is used for any view which is not the main view and which does not contain a graph. This view always has a menu bar with a Help menu in it. The Help menu contains the choices: Help on NetLabs/CCM, Help on Window.

| Properties | Description |
| --- | --- |
| ForeColor | |
| BackColor | |
| Font | used for button text; defaults to parent's font |
| TitleString | sets string in title bar |
| HasRefresh | true/false; determines if view has refresh button |
| NumRows | for defining # of rows in RowColumn coord system |
| NumColumns | for defining # of columns in RowColumn coord system |
| Width, height, xpos, ypos | specify geometry and placement |

Geometry

Graph View. The graph view is used in the same way as view. Graph view must be used if the DSF puts a graph in the view, Graph view can only contain graph subcomponents.

Label. Text with no border.

| Properties | Description |
| --- | --- |
| ForeColor | has default of parent's ForeColor |
| BackColor | has default of parent's BackColor |
| Font | defaults to parent's font |
| Contents | displayed string |
| Xpos | x position of lower left corner (pixel) |
| Ypos | y position of lower left corner (pixel) |
| MaxWidth | # of characters; Contents with more characters get truncated. A value of zero means grow label to fit Contents if necessary. |
| RowPos | row # (of parent view) in which bottom edge of label starts (parent has RowColumn coord system) |
| Columnpos | column # (of parent view) in which left hand side of label starts (parent has RowColumn coord system) |
| #Columns | width in # of columns of the widest character in the font |
| #Rows | height in # of rows of text |

Text. Text with three-dimensional border. Text can be selected, scrolled, and changed by user.

| Properties | Description |
| --- | --- |
| ForeColor | has default of parent's ForeColor |
| BackColor | has default of parent's BackColor |
| Font | defaults to parent's font |
| Contents | displayed string; can be edited by user |
| Xpos | x position of lower left corner |
| Ypos | y position of lower left corner |
| Width | width in # of characters |
| RowPos. | row # (of parent view) in which bottom edge of text starts (parent has RowColumn coord system) |
| ColumnPos | column # (of parent view) in which left hand side of text starts (parent has RowColumn coord system) |
| #Columns | width in # of columns of the widest character in the font |
| #Rows | height in # of rows of text |

List. List is a single-column table. List items can be selected on and double clicked on. Double click invokes "default action". Types of default action supported: open new view. Vertical and horizontal scrollbars may be added and removed as necessary.

| Properties | Description |
| --- | --- |
| ForeColor | has default of parent's ForeColor |
| BackColor | has default of parent's BackColor |
| Font | defaults to parent's font |
| Contents | list of string |
| UserData | list of values; must be same length as contents |
| SelectedUdata | list of values; user data for selected rows only. This property is read-only |
| SelectionMode | single vs. extend or none |
| Xpos | x position of lower left corner (pixel) |
| Ypos | y position of lower left corner (pixel) |
| Width | in characters; assumes fixed-width font |
| Height | in rows |
| RowPos | row # (of parent view) in which bottom edge of list starts (parent has RowColumn coord system) |
| ColumnPos | column # (of parent view) in which left hand side of list starts (parent has RowColumn coord system) |
| NumRows | height in # of rows of parent dialog |
| NumColumns | width in # of columns of parent dialog |

Table. Table is used to display tabular data. Table supports selection of rows, but not columns. Row can be double clicked on, invoking default action. Types of default action supported: open new view.

| Properties | Description |
| --- | --- |
| ForeColor | has default of parent's ForeColor |
| BackColor | has default of parent's BackColor |
| Font | defaults to parent's font |
| Legend | list of string for column headers |
| Columns | list of list of string (mutually exclusive with Rows). Each sublist must be of same length |
| Rows | list of string (mutually exclusive with Columns). Each sublist must be of same length |
| UserData | list of values; must have same length as rows or as one of the lists in Columns |
| SelectedUdata | list of values; user data for selected rows only. This property is read-only |
| SelectionMode | single vs. extend or none |
| Xpos | x position of lower left corner (pixel) |
| Ypos | y position of lower left corner (pixel) |
| Width | in characters; assumes fixed-width font |
| RowPos | row # (of parent view) in which bottom edge of table starts (parent has RowColumn coord system) |
| ColumnPos | column # (of parent view) in which left hand side of table starts (parent has RowColumn coord system) |
| NumRows | height in # of rows |
| NumColumns | width in # of columns |

Circle. Circle is a graphic component. Circle supports selection and double click. Double click invokes default action. Types of default action supported: open new view. Circle is actually contained in rectangular bounding box. The portion of the box that is not filled by the circle is filled with the color "Transparent".

| Properties | Description |
|---|---|
| ForeColor | color of interior |
| BackColor | currently unused |
| BorderColor | color of border |
| Radius | pixels |
| BorderWidth | pixels |
| PixMap | picture to display (clipped) inside the circle |
| Selectable | Boolean |
| Selected | Boolean |
| Xpos | x position of lower left corner (pixel) |
| Ypos | y position of lower left corner (pixel) |

Rectangle. Rectangle is a graphic component. Rectangle supports selection and double click. Double click invokes default action. Types of default action supported: open new view.

| Properties | Description |
|---|---|
| ForeColor | color of interior |
| BackColor | currently unused |
| BorderColor | color of border |
| Width | pixels |
| Height | pixels |
| BorderWidth | pixels |
| Selectable | Boolean |
| Selected | Boolean |
| PixMap | |
| Xpos | x position of lower left corner (pixel) |
| Ypos | y position of lower left corner (pixel) |

Menu. Menu is used for pulldown menus. Each menu choice consists of a pair, <Title, ChoiceTag>. When a menu choice is selected, actions associated with the ChoiceTag are performed. The tag-action pairs are kept with individual components. The action invoked is kept with the view in which the menu is found.

| Properties | Description |
|---|---|
| ForeColor | |
| BackColor | |
| Font | |
| Choices | list of <string, action tag> pairs |

Option Menu. Option menu is similar to a Motif option menu. Each option has a tag associated with it.

| Properties | Description |
|---|---|
| ForeColor | |
| BackColor | |
| Font | |
| Choices | list of <string, tag> pairs |
| CurrentChoice | tag of the currently selected choice |

Graph. There are three basic types of graphs; static, timed, and timestrip.

The parent, static graphs (or just plain Graph) supports the following properties:

In the following, "type *" means "list of type".

| Property | Type | Use |
|---|---|---|
| Xpos | Pixel (num) | Left position on the screen. |
| Ypos | Pixel (num) | Bottom position on the screen. |
| Type | Enum (Bar, Line, Pie) | |
| Title | String * | List of strings that define what title is at the top of the graph. Each string is shown on a new line |
| Legends | String * | Y-axis names. May be longer or shorter than the actual number of y-axes |
| XLegend | String | X-axis name |
| Data | (Num *)* | List of y-columns (lists) of data. |
| Xpoints | Num * | The x-axis points to use in the graph defaults to 0,1,2,3,4,... |
| Xlabels | (num and/or string) * | In a bar chart, the labels beneath each bar. Not visible on a line chart. |
| MaxPoints | Num | Create only, sets the maximum number of points that can be displayed in the graph. Leftmost data is truncated. There is also support for (max,min) X,Y values (used for axis marks), although defaults are used in the preferred embodiment of the invention. |
| 3d | Boolean | Show in 3d or not. |
| ShowGrid | Boolean | Show grid or not. |

Timed graphs support the following extra properties:

| | | |
|---|---|---|
| PeriodChoices | Num * | Defines a list refresh periods displayed on a choice menu in the graph. Entire graph is redisplayed. It is the responsibility of the DSF to take action on the choice (see below). UNITS ARE IN SECONDS |
| CurrentPeriod | Num | Read only, gives the current value of the redisplay period. UNITS ARE IN SECONDS |

Note that there is no "mean" support. This is provided by the semantics of the function being graphed (given by the Data property).

Timestrips support no extra properties, but the semantics of redrawing is different: a point is added on to the graph, rather than redrawing the entire graph.

As an example, a timestrip graph of the number of octets received by port (the "retx1: Octests Received Graph")is defined.

A standard LISP (()) operator is used to define a list.

```
TimeStripGraph Mr__Graph {
    Type = Line
    Title = ("# of Octets Received by Port")
    Legends = ("# of octets received/min by
channel....","# of....")
    XLegend = COND(PeriodChoices,
                    (60, "Time (mins)"),
                    (600, "Time (10 mins)"))
    Data =      ((ReadMib(<#octetsreceivedbyport>[1]),
                (ReadMib(<#octetsreceivedbyport>[1]) )
    #Now for the corresponding timestamps
    # We don't have to specify Xpoints (they'll actually get
    ignored), as
    # timestrips use their own X axis!
    # However, let's say we only want to see the last 10 points
    MaxPoints = 10
}
```

To display the foregoing as a bar chart, always showing the last known point only, the title contains a second line, giving the units.

Note that most of this looks exactly the same, except that XLabels are given.

```
TimedGraph Mr__Graph {
    Type = Bar
    Title = ("Mean # of Octets Received by Port",
             COND(PeriodChoices,
                 (60, "Over the last minute"),
                 (600, "Over the last 10 minutes)))
    Legends = ("# of octets received/min by
        channel....","# of....")
    XLegend = "Port number"
    XLabels = ("Ch A, Port 1", "Ch B, Port 2")
    PeriodChoices = (60,600)
    Data = ((ReadMib(<#octetsreceivedbyport>[1]),
        (ReadMib(<#octetsreceivedbyport>[1]) )
    TimeStamps =
        ((TimeStamp(<#octetsreceivedbyport>[1]),
        (TimeStamp(<#octetsreceivedbyport>[1]) )
    # Note that max points is missing
}
```

Finally, an example is given showing the # of octets as a bar chart, where the chart is updated whenever one of the values changes.

```
Graph Mr__Graph {
    Type = Bar
    Title = ("# of Octets Received by Port")
    Legends = ("# of octets received/min by
        channel....","# of....")
    XLegend = "Port number"
    XLabels = ("Ch A, Port 1", "Ch B, Port 2")
    Data = ((ReadMib(<#octetsreceivedbyport>[1]),
        (ReadMib(<#octetsreceivedbyport>[1])
    # and that's it!
}
```

Note that the previous example left off x,y, width, height, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An apparatus for remotely managing diverse information network resources, comprising:

a plurality of heterogeneous, remote devices of functionally diverse classes, each device providing raw information in one of a plurality of heterogeneous formats, wherein said format is specific to each device and to each device functional class;

a protocol module located at a network management site and in communication with said remote devices for scheduling remote device polls to optimize remote device polling and minimize use of said information network;

a values module located at said network management site for storing data obtained by polling said remote devices, wherein said data are representative by events that occur at said remote devices as the events occur over time, said values module being operable to store, retrieve, and manipulate said raw information, said values module including a time stamp for use in connection with recording a time of occurrence of said remote device events, processing time varying data from said stored remote device events, and for storing common groupings of said raw information;

a nonprocedural builder module located at said network management site and operable to generate a data specification module; said data specification module located at said network management site and operable to store information that specifies device content and behavior for each of said heterogeneous, functionally diverse, remote devices in the form of a device specific representation, wherein said representation appears to a user in the same format for each device within a device functional class even though each functional class may include a plurality of heterogeneous remote devices;

an engine located at said network management site, said engine being operable to read information stored in said data specification module and to generate said device specific representation for each of said remote devices therefrom and, based on the contents of said data specification module and said raw information from said remote devices, to control operation of said remote devices, to enable polls of said remote devices by said protocol module, to process said raw information in accordance with said information stored in said data specification module, to process said common groupings of said raw information stored in said values module from two or more of said remote devices to generate information characterizing inter-device performance therefrom, and to generate poll results for each of said remote devices in the form of said device specific representations; and a user interface module located at said network management site, and, responsive to said engine, for displaying said device specific representations of said remote devices at said network management site as a user controlled virtual panel.

2. The apparatus of claim 1, wherein said engine allows user configuration and control of said remote devices while viewing said device specific representation.

3. The apparatus of claim 2, wherein said protocol module issues simple network management protocol ("SNMP") requests to said remote devices.

4. The apparatus of claim 1, wherein said engine implements user directed control of remote device operational parameters.

5. The apparatus of claim 1, wherein said device specific representation is dynamically updated by said engine to provide current remote device information.

6. The apparatus of claim 1, wherein said device specific representation may be interactively updated by a user to display remote device specific information based on user demand.

7. A method for remotely managing an information network including a plurality of heterogeneous, remote devices of functionally diverse classes, each device providing raw information in one of a plurality of heterogeneous formats, wherein said format is specific to each device and to each device functional class, said method comprising the steps of:

scheduling remote device polls with a protocol module located at a network management site and in communication with said remote devices to optimize remote device polling and minimize use of said information network;

storing data obtained by said remote device polling, wherein said data are representative of events that occur at said remote devices with a values module located at said network management site as the events occur over time, said values module being operable to store, retrieve, and manipulate said raw information, said values module including a time stamp for recording a time of occurrence of said remote device events, processing time varying data from said stored remote device events, and for storing common groupings of said raw information;

generating a data specification module with a nonprocedural builder module located at said network management site;

storing information in said data specification module that specifies device content and behavior for each of said heterogeneous, functionally diverse, remote devices in the form of a device specific representation, wherein said representation appears to a user in the same format for each device within a device functional class even though each functional class may include a plurality of heterogeneous remote devices;

reading information stored in said data specification module with an engine located at said network management site;

generating said device specific representation for each of said remote devices with said engine;

with said engine, controlling operation of said remote devices, enabling polls of said remote devices by said protocol module, processing said raw information in accordance with said information stored in said data specification module, processing said common groupings of said raw information stored in said values module from two or more of said remote devices to generate information characterizing inter-device performance therefrom, and generating poll results for each of said remote devices in the form of said device specific representations; and displaying said device specific representations of said remote devices as a user controlled virtual panel with a user interface module located at said network management site.

8. The method of claim 7, wherein said engine allows user configuration of said remote devices.

9. The method of claim 8, further comprising the step of: issuing simple network management protocol ("SNMP") requests to said remote devices with said protocol module.

10. The method of claim 7, further comprising the step of: allowing user setting of remote device operational parameters with said engine.

11. The method of claim 7, further comprising the step of: dynamically updating said representation with said engine to display current remote device information.

12. The method of claim 7, further comprising the step of: interactively updating said representation with said engine to display remote device information based on user demand.

* * * * *